US012725049B2

(12) United States Patent
Huang et al.

(10) Patent No.: US 12,725,049 B2
(45) Date of Patent: Sep. 1, 2026

(54) MACHINE LEARNING MODEL BASED ON CONSTRAINED DECISION TREES USING A JUDGMENTAL SAMPLE AND FEATURE RANKING

(71) Applicant: Microsoft Technology Licensing, LLC, Redmond, WA (US)

(72) Inventors: Shujuan Huang, Redmond, WA (US); Kiran Rama, Bangalore (IN); Ke Li, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 952 days.

(21) Appl. No.: 17/899,504

(22) Filed: Aug. 30, 2022

(65) Prior Publication Data

US 2024/0070475 A1 Feb. 29, 2024

(51) Int. Cl.
*G06N 5/01* (2023.01)

(52) U.S. Cl.
CPC .................................... *G06N 5/01* (2023.01)

(58) Field of Classification Search
CPC ........... G06N 20/00; G06N 5/01; G06N 3/08; G06N 3/0464; G06N 20/20; G06N 3/0442; G06N 5/04; G06N 3/045; G06N 3/09; G06N 5/02; G06N 20/10; G06N 3/006; G06N 3/0455; G06N 5/041; G06N 7/01; G06N 3/084; G06N 5/025; G06N 3/092; G06N 3/042; G06N 3/044; G06N 3/048;

(Continued)

(56) References Cited

U.S. PATENT DOCUMENTS

2009/0276379 A1* 11/2009 Tzoref .................... G06N 5/02 706/12
2011/0264513 A1 10/2011 Ratnaparkhi
(Continued)

FOREIGN PATENT DOCUMENTS

WO 2021080577 A1 4/2021

OTHER PUBLICATIONS

Multivariate stratified sampling by stochastic multiobjective optimization Diaz-Garcia et al, Jun. 3, 2011 (Year: 2011).*
(Continued)

*Primary Examiner* — Luis A Sitiriche
(74) *Attorney, Agent, or Firm* — Wade IP Law PLLC

(57) ABSTRACT

Techniques are described herein that are capable of generating a machine learning model based on constrained decision trees using a judgmental sample and feature ranking. A judgmental sample including observations, which include respective subsets of features, is generated. The observations are selected using multivariate stratified sampling. Important subsets of the features are determined based on each important subset being designated as more important than the other features by a respective individual. A score is determined for each feature, indicating a proportion of the important subsets that includes the respective feature. A highest scored feature is identified. Constrained decision trees having respective first splits are generated, based on respective subsets of the observations. A proportion of the first splits corresponding to the highest scored feature is based at least on the score of the highest scored feature. A machine learning model is generated based at least on the constrained decision trees.

20 Claims, 7 Drawing Sheets

(58) Field of Classification Search

CPC ........ G06N 5/048; G06N 3/047; G06N 5/022; G06N 3/0475; G06N 3/082; G06N 3/096; G06N 3/0985; G06N 5/046; G06N 5/047; G06N 3/02; G06N 3/04; G06N 3/0499; G06N 3/088; G06N 3/094; G06N 3/126; G06N 5/027; G06N 3/043; G06N 3/049; G06N 3/098; G06N 5/00; G06N 7/02; G06N 99/00; G06N 10/00; G06N 3/0463; G06N 3/063; G06N 3/086; G06N 3/0895; G06N 5/045

See application file for complete search history.

(56) References Cited

U.S. PATENT DOCUMENTS

| | | | | |
|---|---|---|---|---|
| 2013/0124298 | A1 | 5/2013 | Li et al. | |
| 2015/0186938 | A1 | 7/2015 | Zhang | |
| 2017/0330231 | A1 | 11/2017 | Wayne | |
| 2019/0102681 | A1 | 4/2019 | Roberts et al. | |
| 2019/0108444 | A1 | 4/2019 | Song | |
| 2019/0251468 | A1* | 8/2019 | Guillame-Bert | G06N 7/01 |
| 2019/0278378 | A1 | 9/2019 | Yan | |
| 2019/0286984 | A1 | 9/2019 | Vasudevan et al. | |
| 2020/0117906 | A1 | 4/2020 | Lee | |
| 2021/0073672 | A1 | 3/2021 | Shi et al. | |
| 2021/0216923 | A1 | 7/2021 | Rama | |
| 2021/0224862 | A1 | 7/2021 | Taifi et al. | |
| 2021/0256309 | A1 | 8/2021 | Huth et al. | |
| 2022/0171873 | A1 | 6/2022 | Lundbæk | |
| 2022/0171874 | A1 | 6/2022 | Lundbæk | |
| 2022/0391778 | A1 | 12/2022 | Green | |
| 2023/0205915 | A1 | 6/2023 | Wang | |
| 2023/0274183 | A1 | 8/2023 | Mauser | |
| 2024/0054391 | A1 | 2/2024 | Guha Thakurta | |
| 2024/0112032 | A1 | 4/2024 | Rama | |
| 2024/0119484 | A1 | 4/2024 | Rama | |
| 2024/0126794 | A1 | 4/2024 | Cook | |

OTHER PUBLICATIONS

International Preliminary Report on Patentability received for PCT Application No. PCT/US23/031094, Apr. 10, 2025, 11 pages.

Non-Final Office Action mailed on Mar. 3, 2025, in U.S. Appl. No. 17/960,618, 20 pages.

Final Office Action mailed on Aug. 15, 2024, in U.S. Appl. No. 17/960,618, 19 pages.

Ganin, et al., "Unsupervised Domain Adaptation by Backpropagation", In International conference on machine learning, Jul. 6, 2015, 12 Pages.

International Search Report and Written Opinion received for PCT Application No. PCT/US2023/031094, Nov. 9, 2023, 16 pages.

International Search Report and Written Opinion received for PCT Application No. PCT/US23/031352, mailed on Nov. 3, 2023, 18 pages.

Li, et al., "FairSR: Fairness-aware Sequential Recommendation through Multi-Task Learning with Preference Graph Embeddings.", Arxiv.org, Cornell University Library, 201 Olin Library Cornell University, Ithaca, NY, Apr. 30, 2022, 21 Pages.

Li, et al., "Prior-Guided Transfer Learning for Enhancing Item Representation in E-commerce.", In Proceedings of the AAAI Conference on Artificial Intelligence, vol. 36, No. 11, Feb. 22, 2022, pp. 12387-12395.

Non-Final Office Action mailed on Mar. 28, 2024, in U.S. Appl. No. 17/960,618, 17 pages.

International Preliminary Report on Patentability received for PCT Application No. PCT/US23/031352, mailed on Apr. 17, 2025, 13 pages.

"Semi-supervised learning in Scikit learn", Retrieved from: https://web.archive.org/web/20220429081130/https://scikit-learn.org/stable/modules/semi_supervised.html, Apr. 29, 2022, 2 Pages.

"What is an Expert System?", Retrieved from: https://web.archive.org/web/20220309132719/https://www.javatpoint.com/expert-systems-in-artificial-intelligence, Mar. 9, 2022, 10 Pages.

"What is Fuzzy Logic? | Fuzzy Logic, Part 1", Retrieved from: https://www.youtube.com/watch?v=_0nZuG4sTw, Aug. 25, 2021, 4 Pages.

Brownlee, Jason, "Semi-Supervised Learning With Label Propagation", Retrieved from: https://machinelearningmastery.com/semi-supervised-learning-with-label-propagation/, Dec. 30, 2020, 19 Pages.

Chai, Wesley, "fuzzy logic", Retrieved from: https://www.techtarget.com/searchenterpriseai/definition/fuzzy-logic#:~:text=Fuzzy%20logic%20is%20an%20approach,at%20Berkeley%20in%20the%201960s., Jun. 2021, 3 Pages.

Garofalakis, et al., "Building Decision Trees with Constraints", In Data Mining and Knowledge Discovery, vol. 7, Issue 2, Apr. 2003, pp. 187-214.

Guillemot, Agathe, "Interactive decision tree builder", Retrieved from: https://www.dataiku.com/product/plugins/decision-tree-builder/, Nov. 21, 2019, 12 pages.

Sanchez-Roger, et al., "Fuzzy logic and its uses in finance: a systematic review exploring its potential to deal with banking crises", In Journal of Mathematics, vol. 07, Issue 11, Nov. 11, 2019, 22 Pages.

Singh, et al., "Comparative Study Id3, Cart and C4.5 Decision Tree Algorithm: A Survey", In International Journal of Advanced Information Science and Technology, vol. 27, No. 27, Jul. 2014, pp. 97-103.

Verhaeghe, et al., "Learning optimal decision trees using constraint programming", In Journal of Constraints, vol. 25, Issue 3, Oct. 29, 2020, pp. 226-250.

"The Interactive Tree Builder", Retrieved from: https://www.ibm.com/docs/en/spss-modeler/18.1.1?topic=trees-interactive-tree-builder, Mar. 8, 2021, 3 Pages.

Non-Final Office Action mailed on Jul. 11, 2025, in U.S. Appl. No. 17/958,261, 14 pages.

"*Recentive Analytics, Inc.* v. *Fox Corp*", Court Decision by Federal Circuit, Case No. 2023-2437, Apr. 18, 2025, 18Pages.

Final Office Action mailed on Jun. 24, 2025, in U.S. Appl. No. 17/960,618, 24 pages.

Non-Final Office Action mailed on Dec. 8, 2025, in U.S. Appl. No. 17/960,618, 22 pages.

Notice of Allowance mailed on Jan. 6, 2026, in U.S. Appl. No. 17/958,261, 9 pages.

Final Office Action mailed on Apr. 28, 2026, in U.S. Appl. No. 17/960,618, 24 Pages.

* cited by examiner

FIG. 1

MACHINE LEARNING MODEL BASED ON CONSTRAINED DECISION TREES USING A JUDGMENTAL SAMPLE AND FEATURE RANKING

BACKGROUND

A machine learning model may be trained using supervised learning, unsupervised learning, or semi-supervised learning. In supervised learning, the machine learning model infers a function by analyzing labeled data (and not unlabeled data). Labeled data is data that is associated (e.g., tagged) with one or more labels. A label that is associated with data includes information about the data. Unlabeled data is data that is associated with no labels. In supervised learning, after the machine learning model infers the function, the machine learning model may use the function to predict a result based on previously unknown data. In unsupervised learning, the machine learning model learns patterns from unlabeled data (and not labeled data). In semi-supervised learning, the machine learning model learns patterns from a combination of labeled data and unlabeled data.

Labels are associated with data most commonly by humans. For example, a human with expertise in a subject with which the data pertains may generate the labels to be associated with the data. Generation of labels by humans consumes substantial time and resources and is therefore relatively expensive. The information in labels often is subjective, and the labels may reflect biases of the humans who generate the labels. The humans may have different opinions about the importance of features that are used by the machine learning model to make predictions. Accordingly, the humans may not agree on which features are to be used by the machine learning model or which weights are to be assigned to those features.

SUMMARY

It may be desirable to generate a machine learning model based on observations that have no labels, relatively few labels, and/or unreliable labels. In an engineering technical support example, a technical support engineer seeks to generate the machine learning model to determine an optimal resolution to a technical issue. The technical support engineer may have access to information about multiple possible solutions to the technical issue. For instance, the possible solutions may be previous solutions that were implemented by the technical support engineer or by other technical support engineers on the same technical support team to resolve other technical issues. In this example, each possible solution constitutes an observation, and the features of each observation represent characteristics of the respective observation. For instance, each feature may represent a product, a business unit, or a geographical location. However, success of the possible solutions (e.g., likelihood to solve the respective technical issues) may not have been evaluated by any of the technical support engineers on the team, the success of the possible solutions may have been evaluated by only a limited subset of the engineers, and/or the judgment of the technical support engineers may be uncertain. It is possible that a previous solution was a short-term fix that resulted in a longer-term product failure.

In a contractual deal example, a seller of a service seeks to generate the machine learning model to determine optimal terms (e.g., an optimal discount) to be incorporated into a contractual deal. The seller may have access to information about multiple possible combinations of terms to be incorporated into the contractual deal. For instance, the possible combinations of terms may be from previous contractual deals that were closed by the seller or by other sellers of the service. In this example, each possible combination of terms (e.g., each previous contractual deal) constitutes an observation, and the features of each observation represent characteristics of the respective combination of terms. For instance, each feature may represent a buyer, a value of the deal, or a geographical location. However, success of the combinations of terms may not have been evaluated by any of the sellers of the service, or the success of the possible combinations of terms may have been evaluated by only a limited subset of the sellers. It is possible that a previous contractual deal included a substantial discount against a promise of future revenue that did not materialize.

Various approaches are described herein for, among other things, generating a machine learning model based on (e.g., based at least on) constrained decision trees using a judgmental sample and feature ranking. A constrained decision tree is a decision tree in which at least one split is required to correspond to a particular (e.g., pre-determined) attribute. For instance, each attribute may be a respective feature of an observation. An observation represents an occurrence (e.g., an occurrence of an event). Each feature of an observation represents a characteristic of the occurrence that is represented by the observation. A decision tree is a tree structure in which each internal node (a.k.a. split) represents a test regarding an attribute, each branch that extends from an internal node represents an outcome of the test that is represented by the internal node, and each terminal node (a.k.a. leaf node) represents a class label (i.e., a decision). In the decision tree, the internal nodes are arranged in a hierarchy. A highest level of the hierarchy includes a first split (i.e., a first node); a second level of the hierarchy, which is immediately below the highest level, includes a second split; a third level of the hierarchy, which is immediately below the second level, includes a third split, and so on. A judgmental sample is a non-random sample. For instance, the judgmental sample may be selected based on an opinion of an individual (e.g., a human, such as an expert with regard to subject matter to which the judgmental sample pertains). Feature ranking is an act of establishing relative ranks (e.g., priorities) of features that are included among one or more observations.

In a first example approach, a judgmental sample is generated by selecting some but not all identified observations in a dataset using a multivariate stratified sampling technique. Each identified observation includes a subset of features. The multivariate stratified sampling technique results in a proportion of each of multiple subsets of the features among the selected observations being the same as a proportion of the respective subset of the features among the identified observations. Important subsets of the features are determined based at least on each important subset being designated as more important than the other features by a respective individual. Scores for the respective features are determined. Each score indicates a proportion of the important subsets of the features that includes the respective feature. A highest scored feature is identified based at least on the highest scored feature having a score that is no less than the score of each of the other features. Constrained decision trees having respective first splits are generated such that a proportion of the first splits that corresponds to the highest scored feature is based at least on the score of the highest scored feature. The constrained decision trees are based at least on respective subsets of the selected observations. A machine learning model is generated based at least on the constrained decision trees.

In a second example approach, a judgmental sample is generated by selecting some but not all identified observations in a dataset using a multivariate stratified sampling technique. Each identified observation includes a subset of features. The multivariate stratified sampling technique results in a proportion of each of multiple subsets of the features among the selected observations being the same as a proportion of the respective subset of the features among the identified observations. Ranking lists that are associated with respective individuals are determined. Each ranking list indicates relative ranks of the respective features. Scores for the respective features are determined. Each score indicates a proportion of the ranking lists in which the respective feature is ranked highest. A first scored feature is identified based at least on the first scored feature having a score that is no less than the score of each of the other features. Constrained decision trees having respective first splits are generated such that a proportion of the first splits that corresponds to the first scored feature is based at least on the score of the first scored feature. The constrained decision trees are based at least on respective subsets of the selected observations. A machine learning model is generated based at least on the constrained decision trees.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example constrained tree-based ML model system in accordance with an embodiment.

Figure 2:
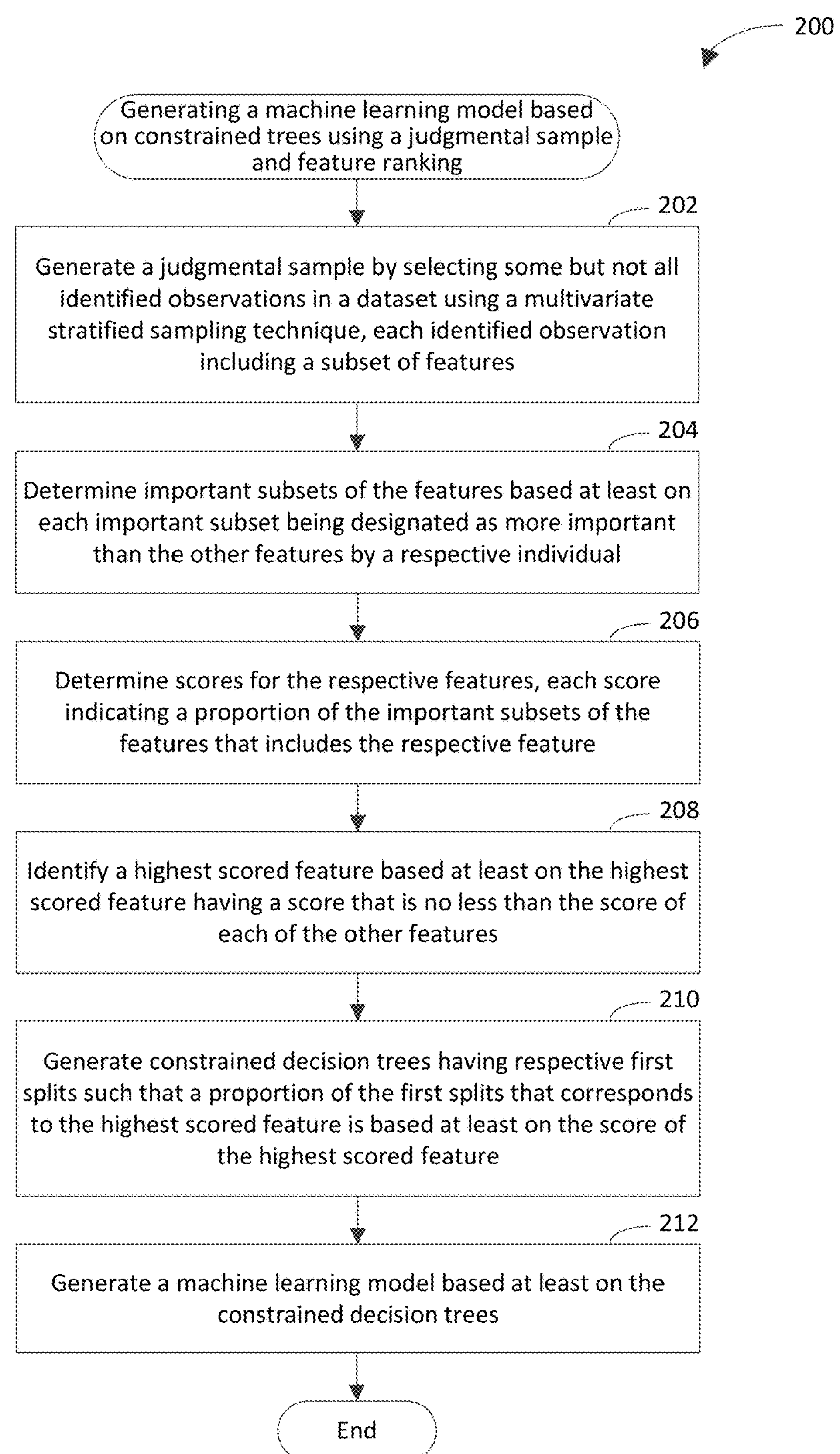
FIGS. 2 and 6-8 depict flowcharts of example methods for generating a machine learning model based on constrained trees using a judgmental sample and feature ranking in accordance with embodiments.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to generate a machine learning model based on observations that have no labels, relatively few labels, and/or unreliable labels. In an engineering technical support example, a technical support engineer seeks to generate the machine learning model to determine an optimal resolution to a technical issue. The technical support engineer may have access to information about multiple possible solutions to the technical issue. For instance, the possible solutions may be previous solutions that were implemented by the technical support engineer or by other technical support engineers on the same technical support team to resolve other technical issues. In this example, each possible solution constitutes an observation, and the features of each observation represent characteristics of the respective observation. For instance, each feature may represent a product, a business unit, or a geographical location. However, success of the possible solutions may not have been evaluated by any of the technical support engineers on the team, the success of the possible solutions may have been evaluated by only a limited subset of the engineers, and/or the experience of the technical support engineers who evaluated the success of possible solution(s) may be uncertain. It is possible that a previous solution would not be advisable. For instance, the previous solution may have been a short-term fix that resulted in a longer-term product failure.

In a contractual deal example, a seller of a service seeks to generate the machine learning model to determine optimal terms (e.g., an optimal discount) to be incorporated into a contractual deal. The seller may have access to information about multiple possible combinations of terms to be incorporated into the contractual deal. For instance, the possible combinations of terms may be from previous contractual deals that were closed by the seller or by other sellers of the service. In this example, each possible combination of terms (e.g., each previous contractual deal) constitutes an observation, and the features of each observation represent characteristics of the respective combination of terms. For instance, each feature may represent a buyer, a value of the deal, or a geographical location. However, success of the combinations of terms may not have been evaluated by any of the sellers of the service, the success of the possible combinations of terms may have been evaluated by only a limited subset of the sellers, and/or the competency of the sellers who evaluated the success of possible combination(s) of terms may be uncertain. It is possible that a previous contractual deal included terms that would not be advisable. For instance, the previous contractual deal may have included a substantial discount against a promise of future revenue that did not materialize.

Example embodiments described herein are capable of generating a machine learning model based on (e.g., based at least on) constrained decision trees using a judgmental sample and feature ranking. A constrained decision tree is a decision tree in which at least one split is required to correspond to a particular (e.g., pre-determined) attribute. For instance, each attribute may be a respective feature of an observation. An observation represents an occurrence (e.g., an occurrence of an event). Each feature of an observation represents a characteristic of the occurrence that is represented by the observation. A decision tree is a tree structure in which each internal node (a.k.a. split) represents a test regarding an attribute, each branch that extends from an internal node represents an outcome of the test that is represented by the internal node, and each terminal node (a.k.a. leaf node) represents a class label (i.e., a decision). In the decision tree, the internal nodes are arranged in a hierarchy. A highest level of the hierarchy includes a first split (i.e., a first node); a second level of the hierarchy, which is immediately below the highest level, includes a second split; a third level of the hierarchy, which is immediately below the second level, includes a third split, and so on. A judgmental sample is a non-random sample. For instance, the judgmental sample may be selected based on an opinion of an individual (e.g., a human, such as an expert with regard to subject matter to which the judgmental sample pertains). Feature ranking is an act of establishing relative ranks (e.g., priorities) of features that are included among one or more observations.

Example techniques described herein have a variety of benefits as compared to conventional techniques for generating a machine learning model. For instance, the example techniques may be capable of increasing accuracy, precision, and/or reliability of predictions that are provided by the machine learning model, for example, by causing a proportion of the constrained decision trees that has a first split that corresponds to a particular feature to be based on a proportion of individuals that considers the particular feature more important than other features. The accuracy, precision, and/or reliability of the predictions may be further increased by applying this same logic to other splits, such as a second split or a third split. For example, a proportion of the constrained decision trees that has a second split that corresponds to a particular feature may be based on a proportion of the individuals that considers the particular feature more important than other features, except for the feature having the highest importance.

The example techniques may reduce subjectivity and bias associated with labels by using fuzzy labels and/or by aggregating the labels associated with each feature of an observation. A fuzzy label is a label that is capable of having a non-binary value (e.g., any suitable value between 0 and 1). The constrained decision trees may be configured to generate respective predictions that are based on respective subsets of the fuzzy labels and/or aggregated labels. The machine learning model may generate an output that corresponds to an aggregation of the predictions that are generated by the respective constrained decision trees. In this manner, the example techniques may narrow the gap between the most mathematically accurate prediction and the prediction that is considered to be the most accurate by individuals.

The example techniques may automate generation of labels for observations and/or for features of the observations. Accordingly, the amount of time that is consumed to generate such labels may be reduced. For example, the example techniques may automatically assign a label of a particular observation to each other observation that has a similarity to the particular observation that is greater than or equal to a similarity threshold. For instance, the label of the particular observation may be propagated to nearest neighbors of the particular observation. By automating the generation of the labels, an efficiency of users who would otherwise be tasked with generating the labels is increased. By eliminating a need for the users to generate the labels manually, a cost of generating the machine learning model may be reduced. For instance, time spent by the users to manually generate the labels has an associated cost. By eliminating the manual label generation, the cost of generating the machine learning model can be reduced by the labor cost associated with the users performing the manual label generation.

The example techniques may reduce an amount of time and/or resources (e.g., processor cycles, memory, network bandwidth) that is consumed to generate a machine learning model. For instance, by automatically generating labels for observations and/or for features of the observations, the time and/or resources that would have been consumed to determine what the labels should be is reduced. By reducing the amount of time and/or resources that is consumed by a computing system to generate the machine learning model, the efficiency of the computing system may be increased.

Figure 1:
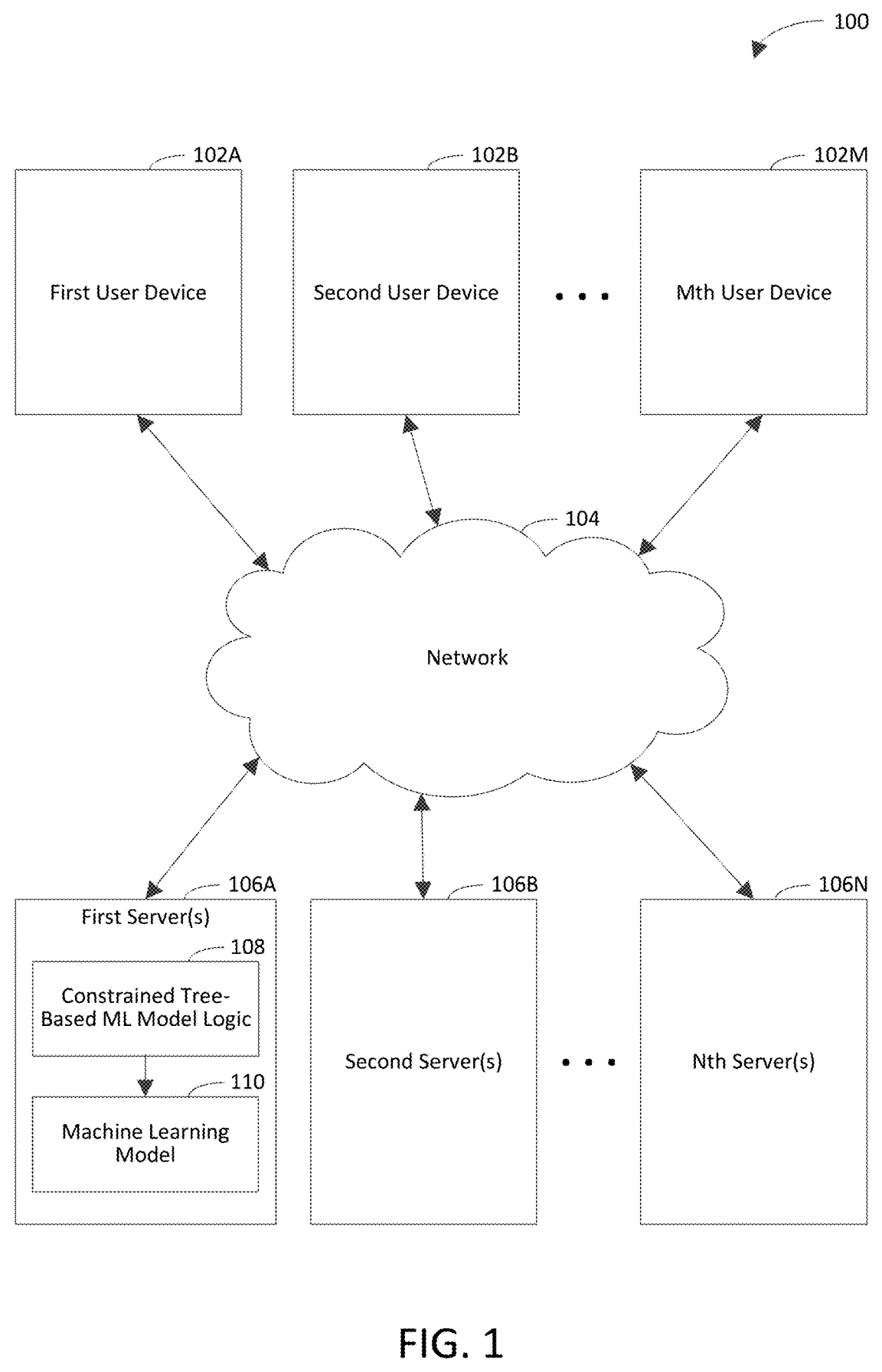

FIG. 1 is a block diagram of an example constrained tree-based ML model system 100 in accordance with an embodiment. Generally speaking, the constrained tree-based ML model system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the constrained tree-based ML model system 100 generates a machine learning model 110 based on constrained decision trees using a judgmental sample and feature ranking. Detail regarding techniques for generating a machine learning model based on constrained decision trees using a judgmental sample and feature ranking is provided in the following discussion.

As shown in FIG. 1, the constrained tree-based ML model system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes a processing system comprising at least one processor that is capable of manipulating data in accordance with a set of instructions. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the constrained tree-based ML model system 100.

The first server(s) 106A are shown to include constrained tree-based ML model logic 108 and the machine learning model 110 for illustrative purposes. The constrained tree-based ML model logic 108 is configured to generate a judgmental sample by selecting some but not all identified observations in a dataset using a multivariate stratified sampling technique. Each identified observation includes a subset of features. The multivariate stratified sampling technique results in a proportion of each of multiple subsets of the features among the selected observations being the same as a proportion of the respective subset of the features among the identified observations.

In a first example implementation, the constrained tree-based ML model logic 108 is further configured to determine important subsets of the features based at least on each important subset being designated as more important than the other features by a respective individual. The constrained tree-based ML model logic 108 is further configured to determine scores for the respective features. Each score indicates a proportion of the important subsets of the features that includes the respective feature. The constrained tree-based ML model logic 108 is further configured to identify a highest scored feature based at least on the highest scored feature having a score that is no less than the score of each of the other features. constrained tree-based ML model logic 108 is further configured to generate constrained decision trees having respective first splits such that a proportion of the first splits that corresponds to the highest scored feature is based at least on the score of the highest scored feature. The constrained decision trees are based at least on respective subsets of the selected observations. constrained tree-based ML model logic 108 is further configured to generate a machine learning model based at least on the constrained decision trees.

In a second example implementation, the constrained tree-based ML model logic 108 is further configured to determine ranking lists that are associated with respective individuals. Each ranking list indicates relative ranks of the respective features. The constrained tree-based ML model logic 108 is further configured to determine scores for the respective features. Each score indicates a proportion of the ranking lists in which the respective feature is ranked highest. The constrained tree-based ML model logic 108 is further configured to identify a first scored feature based at least on the first scored feature having a score that is no less than the score of each of the other features. The constrained tree-based ML model logic 108 is further configured to generate constrained decision trees having respective first splits such that a proportion of the first splits that corresponds to the first scored feature is based at least on the score of the first scored feature. The constrained decision trees are based at least on respective subsets of the selected observations. The constrained tree-based ML model logic 108 is further configured to generate a machine learning model based at least on the constrained decision trees.

In an example judgment sampling embodiment, the features are represented as F1, F2, . . . , Fk. The identified observations are represented as O1, O2, . . . , On. Unique combinations of features are identified by drawing m1 samples from the identified observations, where m1<<n. Multivariate stratified sampling is used to cause the number of each combination of features in the m1 samples to be the same as the number of the respective combination in the identified observations.

In a quota sampling aspect of this embodiment, if some important features are under-represented in the samples due to an imbalance, additional m2 quota-based samples are drawn to amplify their influence on the model, where m2<<n.

In a combination discarding aspect of this embodiment, sparse combinations (i.e., those that are very few in number) are discarded from the dataset. The discarded combinations have a sample size m3.

In accordance with the judgment sampling embodiment, the sample size of the selected observations is m1+m2-m3<<n.

In an example fuzzy label embodiment, the sample observations are represented as O1, O2, . . . , Om. Each selected observation Oi has a set of labels Li1, Li2, . . . , Lik, where k is the number of the individuals. The label for each observation Oi is set to be the average of the labels assigned to that observation by the respective individuals. Accordingly, Li equals the sum of (Lik/K) from k=1 to K. It will be recognized that if the set of labels has binary values, the average value can be any decimal value between 0 and 1 to represent the fuzziness.

In a feature importance aspect of this embodiment, each of the K individuals provides a ranking of the feature importance that went into their decision making. Fjk represents the jth important feature as ranked by the kth individual. In accordance with this aspect, each of the features has a weight that is based on the number of votes that the feature received from the individuals. For example, if a feature A shows up twice as the first important feature by two of the K individuals, then the weight of feature A is 2/K. Accordingly, feature A is used as the first split in 2/K of the constrained decision trees.

In an example bagging embodiment, model training may be described using the following pseudocode:

```
trees=[ ] #List to store the trees
for t in range(number0_of_trees)://i.e., build different trees
  feature=get_feature (t)
  //Here get_feature returns two types of features
    //Type 1: Features that constrain the tree development and are
weighted by experts
    //Type 2: All other features that might be related to the target or
decision making
  tree= custom_tree (feature)
  //There are two steps in this custom tree sequentially:
    //Step 1: Features that specify the first Z splits of the tree; Z =
    positive integer
    //Step 2: Auto train the remaining tree without constraints following
Step 1 using other features
  trees.append (tree)
```

In the bagging embodiment, model prediction may be described using the following pseudocode:

```
Get_prediction (obs):
  Concatenate predictions from each of the trees in the list
  Return the average prediction
```

It will be recognized that the basic tree construction can utilize any suitable decision tree algorithms, including but not limited to CART, ID3, C4.5, or CHAID. The split criterion can be any suitable criterion, including but not limited to Gini index, entropy/gain, information gains ratio, or a Chi-square statistic. The stopping criterion has similar freedom. In accordance with the bagging embodiment, once the constrains have been applied using weighted features importance from Step 2 in the first Z splits, the model will be trained sequentially like regular bagging trees with bootstrapping sampling and ensemble rules.

The constrained tree-based ML model logic 108 may be implemented in various ways to generate the machine learning model 110 based on constrained decision trees using a judgmental sample and feature ranking, including being implemented in hardware, software, firmware, or any combination thereof. For example, the constrained tree-based ML model logic 108 may be implemented as computer program code configured to be executed in one or more processors. In another example, at least a portion of the constrained tree-based ML model logic 108 may be implemented as hardware logic/electrical circuitry. For instance, at least a portion of the constrained tree-based ML model logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

Figure 3:
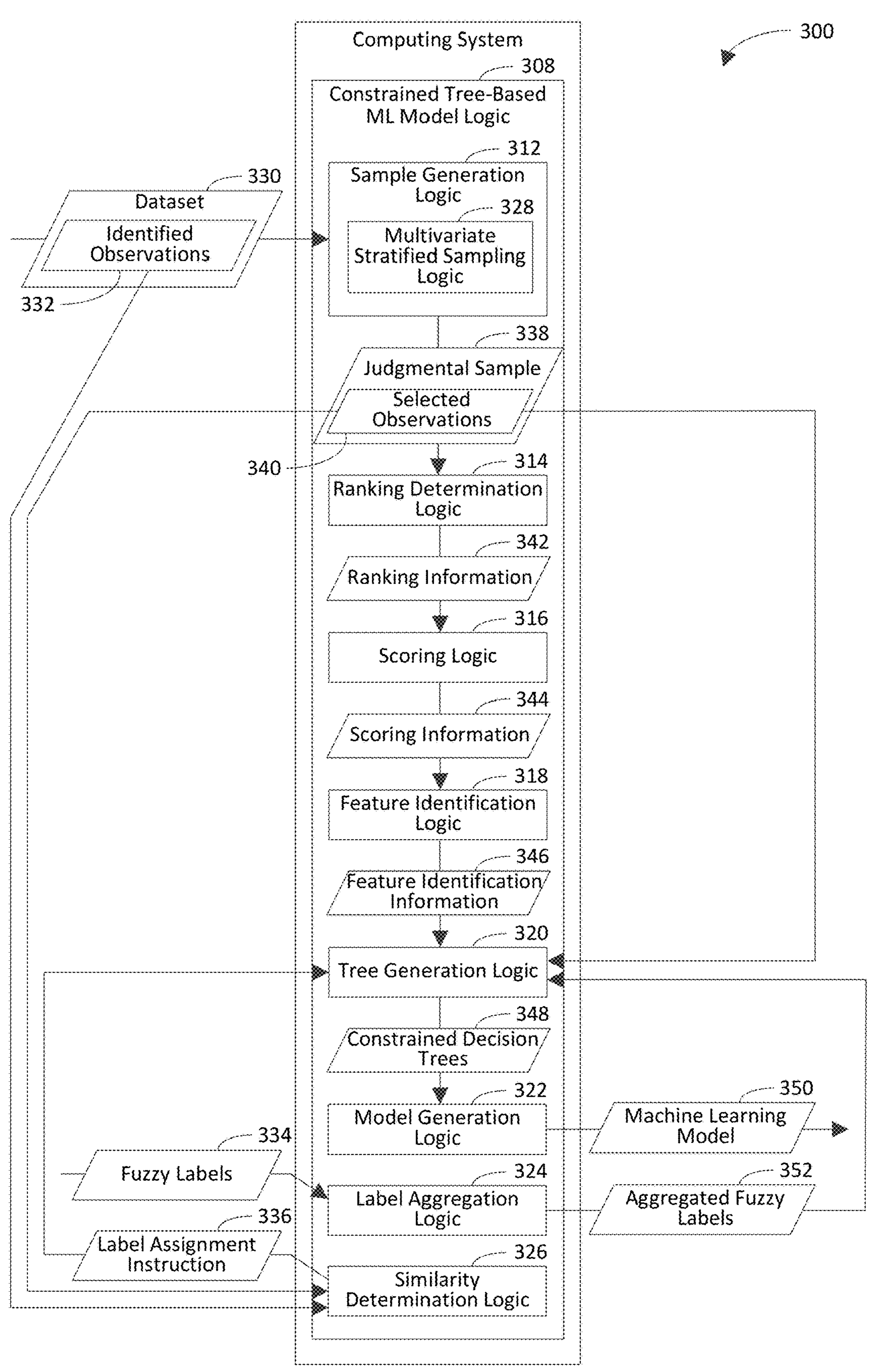
FIG. 3 is a block diagram of an example computing system in accordance with an embodiment.

The constrained tree-based ML model logic 108 and the machine learning model 110 are shown to be incorporated in the first server(s) 106A for illustrative purposes and are not intended to be limiting. It will be recognized that the constrained tree-based ML model logic 108 (or any portion(s) thereof) may be incorporated in any one or more of the servers 106A-106N, any one or more of the user devices 102A-102M, or any combination thereof. For example, client-side aspects of the constrained tree-based ML model logic 108 may be incorporated in one or more of the user devices 102A-102M, and server-side aspects of constrained tree-based ML model logic 108 may be incorporated in one or more of the servers 106A-106N. It will be further recognized that the machine learning model 110 (or any portion(s) thereof) may be incorporated in any one or more of the servers 106A-106N, any one or more of the user devices 102A-102M, or any combination thereof. FIG. 2 depicts a flowchart 200 of an example method for generating a machine learning model based on constrained trees using a judgmental sample and feature ranking in accordance with an embodiment. Flowchart 200 may be performed by the first server(s) 106A shown in FIG. 1, for example. For illustrative purposes, flowchart 200 is described with respect to computing system 300 shown in FIG. 3, which is an example implementation of the first server(s) 106A. As shown in FIG. 3, the computing system 300 includes constrained tree-based ML model logic 308. The constrained tree-based ML model logic 308 includes sample generation logic 312, ranking determination logic 314, scoring logic 316, feature identification logic 318, tree generation logic 320, model generation logic 322, label aggregation logic 324, and similarity determination logic 326. The sample generation logic 312 includes multivariate stratified sampling logic 328. Further structural and operational embodiments will be apparent to persons skilled in the relevant art(s) based on the discussion regarding flowchart 200.

As shown in FIG. 2, the method of flowchart 200 begins at step 202. In step 202, a judgmental sample is generated by selecting some but not all identified observations in a dataset using a multivariate stratified sampling technique. Each identified observation includes a subset of features. The multivariate stratified sampling technique results in a proportion of each of multiple subsets of the features among the selected observations being the same as a proportion of the respective subset of the features among the identified observations. A multivariate stratified sampling technique is a sampling technique in which a population is divided into multiple homogeneous subgroups (a.k.a. strata) based on one or more attributes. In the embodiment of FIG. 2, the population includes the identified observations. Examples of an attribute include but are not limited to a combination of features and a proportion of a combination of features among the identified observations. Examples of an identified observation include but are not limited to an engineering technical support case and a contractual deal. Examples of a feature in an engineering technical support case include but are not limited to a product, a business unit, and a geographical location. Examples of a feature in a contractual deal include but are not limited to a buyer, a value of the deal, and a geographical location.

In an example embodiment, generating the judgmental sample at step 202 further includes determining that a proportion of a selected observation among the selected observations is less than or equal to a proportion threshold. In accordance with this embodiment, generating the judgmental sample at step 202 further includes removing the selected observation from the judgmental sample based at least on the proportion of the selected observation among the selected observations being less than or equal to the proportion threshold.

In an example implementation, the multivariate stratified sampling logic 328 generates a judgmental sample 338 by selecting some but not all identified observations 332, which are included in a dataset 330, using a multivariate stratified sampling technique. Each of the identified observations 332 includes a subset of a plurality of features. Performance of the multivariate stratified sampling technique results in a proportion of each of multiple subsets of the features among the selected observations 340 being the same as a proportion of the respective subset of the features among the identified observations 332.

At step 204, important subsets of the features are determined based at least one each important subset being designated as more important than the other features by a respective individual. Each important subset of the features may include any suitable number of features (e.g., 1, 2, 3, 4, or 5 features). Each important subset of the features need not necessarily be the same as any of the subsets of features mentioned above with regard to step 202. In an example implementation, the ranking determination logic 314 determines the important subsets of the features. In accordance with this implementation, the ranking determination logic 314 generates ranking information 342 to indicate the important subsets of the features that are designated by the respective individuals.

At step 206, scores are determined for the respective features. Each score indicates a proportion of the important subsets of the features that includes the respective feature. In an example implementation, the scoring logic 316 determines the scores for the respective features. For instance, the scoring logic 316 may analyze the ranking information 342 to identify the features that are included in each important subset of the features. For each feature, the scoring logic 316 may divide a number of the important subsets that include the feature by a total number of the important subsets to determine the score for the respective feature. In accordance with this implementation, the scoring logic 316 generates scoring information 344 to indicate the score for each of the features. For instance, the scoring information 344 may cross-reference the scores with the respective features.

In an example embodiment, each important subset of the features includes a respective single feature that is designated as being more important than the other features by the respective individual.

At step 208, a highest scored feature is identified based at least on the highest scored feature having a score that is no less than the score of each of the other features. In an example implementation, the feature identification logic 318 identifies the highest scored feature. For instance, the feature identification logic 318 may analyze the scoring information 344 to determine the scores for the respective features. The feature identification logic 318 may compare the scores for the respective features to identify a score that is no less than the other scores. The feature identification logic 318 may analyze the scoring information 344 to cross-reference the score that is no less than the other scores with the corresponding feature, which is the highest scored feature. In accordance with this implementation, the feature identification logic 318 generates feature identification information 346 to indicate the highest scored feature and the score of the highest scored feature.

At step 210, constrained decision trees having respective first splits are generated such that a proportion of the first splits that corresponds to the highest scored feature is based at least on the score of the highest scored feature. For instance, the proportion of the first splits that corresponds to the highest scored feature may be selected to be equal to the score of the highest scored feature. The constrained decision trees are based at least on respective subsets of the selected observations. In an example embodiment, each subset of the selected observations is different from the other subsets in an effort to make the machine learning model robust and to reduce biasing and overfitting, but the sample size (i.e., the number of selected observations in each subset) is the same for each constrained decision tree. Each constrained decision tree may be a regression tree or a classification tree. A regression tree is a decision tree in which the target variable is capable of taking continuous values (e.g., real numbers). The regression tree may be configured to minimize mean square error. A classification tree is a decision tree in which the target variable is capable of taking a discrete set of values. The classification tree may be configured to minimize entropy or log loss.

In an example implementation, the tree generation logic 302 generates constrained decision trees 348 based at least on respective subsets of the selected observations 340. For instance, the tree generation logic 302 may generate the constrained decision trees 348 using a bootstrapping sampling size with re-sampling. The tree generation logic 302 generates the constrained decision trees 348 to have respective first splits such that a proportion of the first splits that corresponds to the highest scored feature is based at least on the score of the highest scored feature. In an aspect of this implementation, the tree generation logic 320 analyzes the feature identification information 346 to determine the highest scored feature and the score of the highest scored feature. In accordance with this aspect, the tree generation logic 320 configures a specified proportion of the constrained decision trees 348 to have a first split that corresponds to the highest scored feature. The specified proportion is based on (e.g., equal to) the score of the highest scored feature.

At step 212, a machine learning model is generated based at least on the constrained decision trees. In an example implementation, the model generation logic 322 generates the machine learning model 350 based at least on the constrained decision trees 348. For instance, the model generation logic 322 may generate the machine learning model 350 by configuring the machine learning model 350 to have an output that corresponds to an aggregation (e.g., an average, such as a weighted average) of predictions that are generated by the respective constrained decision trees.

In some example embodiments, one or more steps 202, 204, 206, 208, 210, and/or 212 of flowchart 200 may not be performed. Moreover, steps in addition to or in lieu of steps 202, 204, 206, 208, 210, and/or 212 may be performed. For instance, in an example embodiment, the method of flowchart 200 further includes, for each selected observation, aggregating multiple fuzzy labels indicating respective non-binary scores assigned to the respective selected observation by the respective individuals to provide a respective aggregated fuzzy label indicating a likelihood of a designated result of the respective selected observation. A fuzzy label is a label that is capable of having a non-binary value (e.g., any suitable value between 0 and 1). In an aspect of this embodiment, each aggregated fuzzy label is associated with a result (a.k.a. a label, a target, or a Y) of the respective selected observation. In another aspect of this embodiment, aggregating the fuzzy labels includes calculating an average of the fuzzy labels or calculating a mode of the fuzzy labels. In accordance with this embodiment, the label aggregation logic 324 receives fuzzy labels 334, which include a plurality of fuzzy labels for each of the selected observations 340. In further accordance with this embodiment, for each of the selected observations 340, the label aggregation logic 324 aggregates the plurality of fuzzy labels indicating the plurality of respective non-binary scores assigned to the respective selected observation by the respective individuals to provide a respective aggregated fuzzy label indicating a likelihood of a designated result of the respective selected observation. In this manner, the label aggregation logic generates the aggregated fuzzy labels 352 for the respective selected observations 340. In further accordance with this embodiment, the constrained decision trees are generated at step 210 further such that the constrained decision trees generate respective predictions that are based at least on respective subsets of the aggregated fuzzy labels. For instance, the tree generation logic 320 may generate the constrained decision trees 348 further such that the constrained decision trees 348 generate respective predictions that are based at least on respective subsets of the aggregated fuzzy labels 352. In further accordance with this embodiment, generating the machine learning model at step 212 includes configuring the machine learning model to have an output that corresponds to an aggregation of the predictions that are generated by the respective constrained decision trees. For instance, the model generation logic 320 may configure the machine learning model 350 to have an output that corresponds to an aggregation of the predictions that are generated by the respective constrained decision trees 348.

In an aspect of this embodiment, the method of flowchart 200 further includes identifying each of the identified observations that has a similarity to a specified selected observation that is greater than or equal to a similarity threshold. It should be noted that the specified selected observation is included in selected observations in the judgmental sample. The similarity of each identified observation to the specified selected observation may be based on a Euclidian distance between the respective identified observation and the specified selected observation, though the example embodiments are not limited in this respect. In an example implementation, the similarity determination logic 326 identifies each of the identified observations 332 that has a similarity to the specified selected observation that is greater than or equal to the similarity threshold. For instance, the similarity determination logic 326 may compare each of the selected observations 340 to each of the identified observations 332 to make the determination. In accordance with this implementation, the similarity determination logic 326 generates a label assignment instruction 336 that instructs the tree generation logic 320 to assign the aggregated fuzzy label of the specified selected observation to each of the identified observations 332 that is included in a specified subset. The specified subset includes each of the identified observations 332 that has a similarity to the specified selected observation that is greater than or equal to the similarity threshold. For instance, the label assignment instruction 336 may distinguish the identified observations 332 that are included in the specified subset from the identified observations 332 that are not included in the specified subset.

In accordance with this aspect, the method of flowchart 200 further includes assigning (e.g., propagating) the aggregated fuzzy label of the specified selected observation to each of the identified observations that has a similarity to the specified selected observation that is greater than or equal to the similarity threshold. In an example implementation, the tree generation logic 320 assigns the aggregated fuzzy label of the specified selected observation to each of the identified observations 332 that has a similarity to the specified selected observation that is greater than or equal to the similarity threshold. For example, the tree generation logic 320 may assign the aggregated fuzzy label of the specified selected observation to each of the identified observations 332 that is included in the specified subset based on receipt of the label assignment instruction 336 (e.g., based on the label assignment instruction 336 instructing the tree generation logic 320 to assign the aggregated fuzzy label of the specified selected observation to each of the identified observations 332 that is included in a specified subset).

It will be recognized that the actions in this aspect may be performed for any one or more of the selected observations. For example, the method of flowchart 200 may further include, for each of the selected observations, identifying each of the identified observations that has a similarity to the respective selected observation that is greater than or equal to a similarity threshold. In accordance with this example, the method of flowchart 200 may further include, for each of the selected observations, assigning the aggregated fuzzy label of the respective selected observation to each of the identified observations that has a similarity to the respective selected observation that is greater than or equal to the similarity threshold. In accordance with this example, the aforementioned steps may be iteratively performed for a fixed number of iterations. The fixed number may be any suitable number (e.g., 1, 2, 3, 4, or 5).

In another example embodiment, the method of flowchart 200 further includes identifying a second-highest scored feature based at least on the second-highest scored feature having a score that is less than the score of the highest scored feature and no less than the score of each of the other features, except for the highest scored feature. In an example implementation, the feature identification logic 318 identifies the second-highest scored feature. For instance, the feature identification logic 318 may analyze the scoring information 344 to determine the scores for the respective features. The feature identification logic 318 may compare the scores for the respective features to identify a score (i.e., an identified score) that is no less than the score of the highest scored feature and no less than the score of each of the other features, except for the highest scored feature. The feature identification logic 318 may analyze the scoring information 344 to cross-reference the identified score with the corresponding feature, which is the second-highest scored feature. In accordance with this implementation, the feature identification logic 318 generates feature identification information 346 to indicate the second-highest scored feature and the score of the second-highest scored feature. In accordance with this embodiment, a proportion of the first splits that corresponds to the second-highest scored feature is based at least on (e.g., selected to be equal to) the score of the second-highest scored feature. In an example implementation, the tree generation logic 320 generates the constrained decision trees 348 such that a proportion of the first splits that corresponds to the second-highest scored feature is based at least on the score of the second-highest scored feature.

Figures 4, 5:
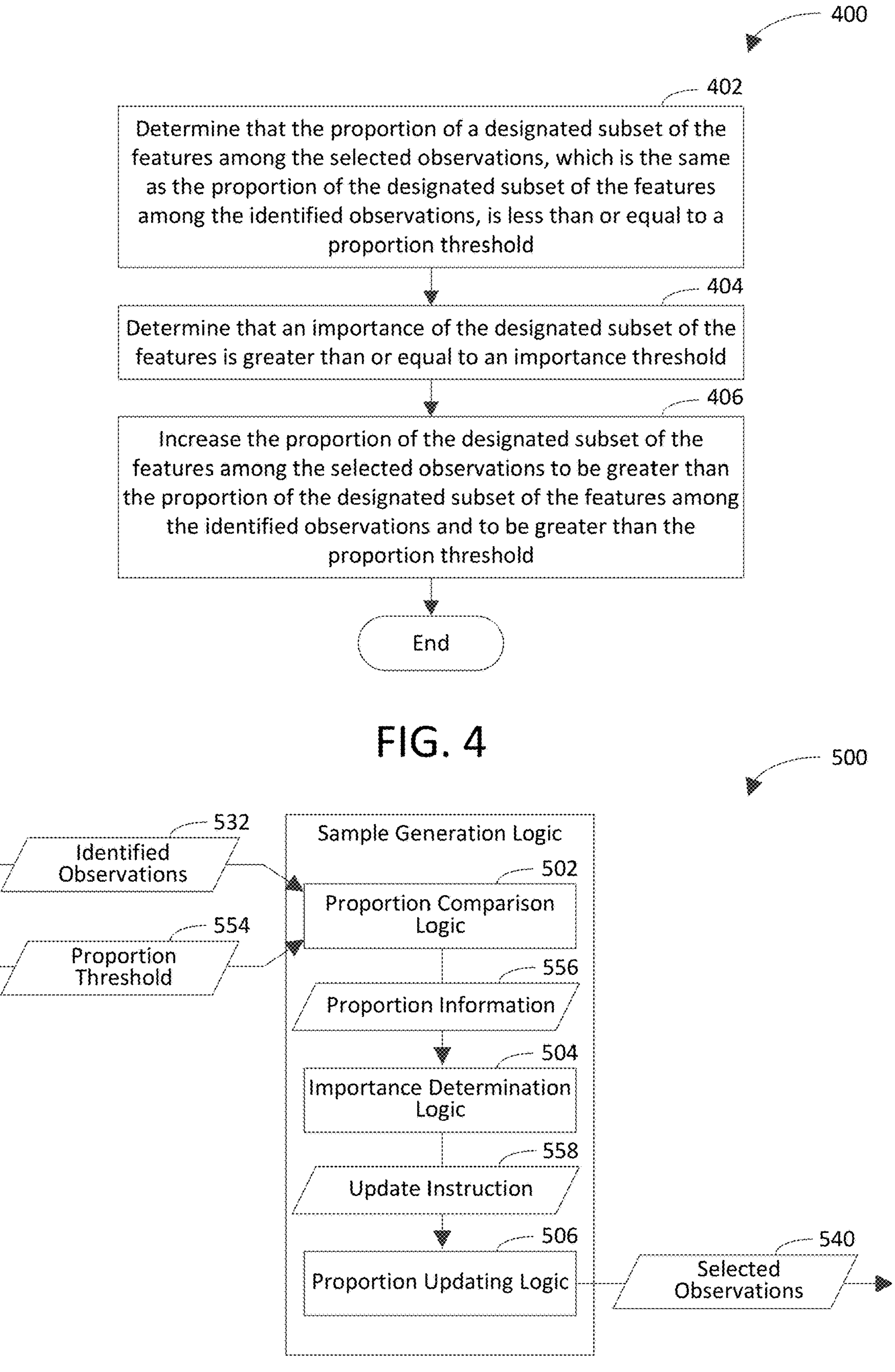
FIG. 4 depicts a flowchart of an example method for generating a judgmental sample in accordance with embodiments.
FIG. 5 is a block diagram of an example implementation of sample generation logic shown in FIG. 3 in accordance with an embodiment.

In yet another example embodiment, generating the judgmental sample at step 202 includes one or more of the steps shown in flowchart 400 of FIG. 4. Flowchart 400 may be performed by the sample generation logic 312 shown in FIG. 3, for example. For illustrative purposes, flowchart 400 is described with respect to sample generation logic 500 shown in FIG. 5, which is an example implementation of the sample generation logic 312. As shown in FIG. 5, the sample generation logic 500 includes proportional comparison logic 502, importance determination logic 504, and proportion updating logic 506. Further structural and operational embodiments will be apparent to persons skilled in the relevant art(s) based on the discussion regarding flowchart 400.

As shown in FIG. 4, the method of flowchart 400 begins at step 402. In step 402, a determination is made that the proportion of a designated subset of the features among the selected observations, which is the same as the proportion of the designated subset of the features among the identified observations, is less than or equal to a proportion threshold. In an example implementation, proportion comparison logic 502 determines that the proportion of the designated subset of the features among the selected observations 540, which is the same as the proportion of the designated subset of the features among the identified observations 532, is less than or equal to a proportion threshold 554. In accordance with this implementation, the proportion comparison logic 502 generates proportion information 556 to indicate that the proportion of the designated subset of the features among the selected observations 540 is less than or equal to the proportion threshold 554. For instance, the proportion information 556 may include an instruction that instructs the importance determination logic 504 to determine whether the importance of the designated subset of the features is greater than or equal to an importance threshold.

At step 404, a determination is made that an importance of the designated subset of the features is greater than or equal to an importance threshold. In an example implementation, the importance determination logic 504 determines that the importance of the designated subset of the features is greater than or equal to the importance threshold. In accordance with this embodiment, as a result of making the determination that the importance of the designated subset of the features is greater than or equal to the importance threshold, the importance determination logic 504 generates an update instruction 558, which instructs the proportion updating logic 506 to increase the proportion of the designated subset of the features among the selected observations 540 to be greater than the proportion of the designated subset of the features among the identified observations 532 and to be greater than the proportion threshold.

At step 406, the proportion of the designated subset of the features among the selected observations is increased to be greater than the proportion of the designated subset of the features among the identified observations and to be greater than the proportion threshold. In an example implementation, the proportion updating logic 506 increases the proportion of the designated subset of the features among the selected observations 540 to be greater than the proportion of the designated subset of the features among the identified observations 532 and to be greater than the proportion threshold. For instance, the proportion updating logic 506 may increase the proportion in this manner based on receipt of the update instruction 558 (e.g., based on the update instruction 558 instructing the proportion updating logic 506 to increase the proportion of the designated subset of the features among the selected observations 540 to be greater than the proportion of the designated subset of the features among the identified observations 532 and to be greater than the proportion threshold).

It will be recognized that the sample generation logic 500 may not include one or more of the proportional comparison logic 502, the importance determination logic 504, and/or the proportion updating logic 506. Furthermore, the sample generation logic 500 may include components in addition to or in lieu of the proportional comparison logic 502, the importance determination logic 504, and/or the proportion updating logic 506.

Figure 6:
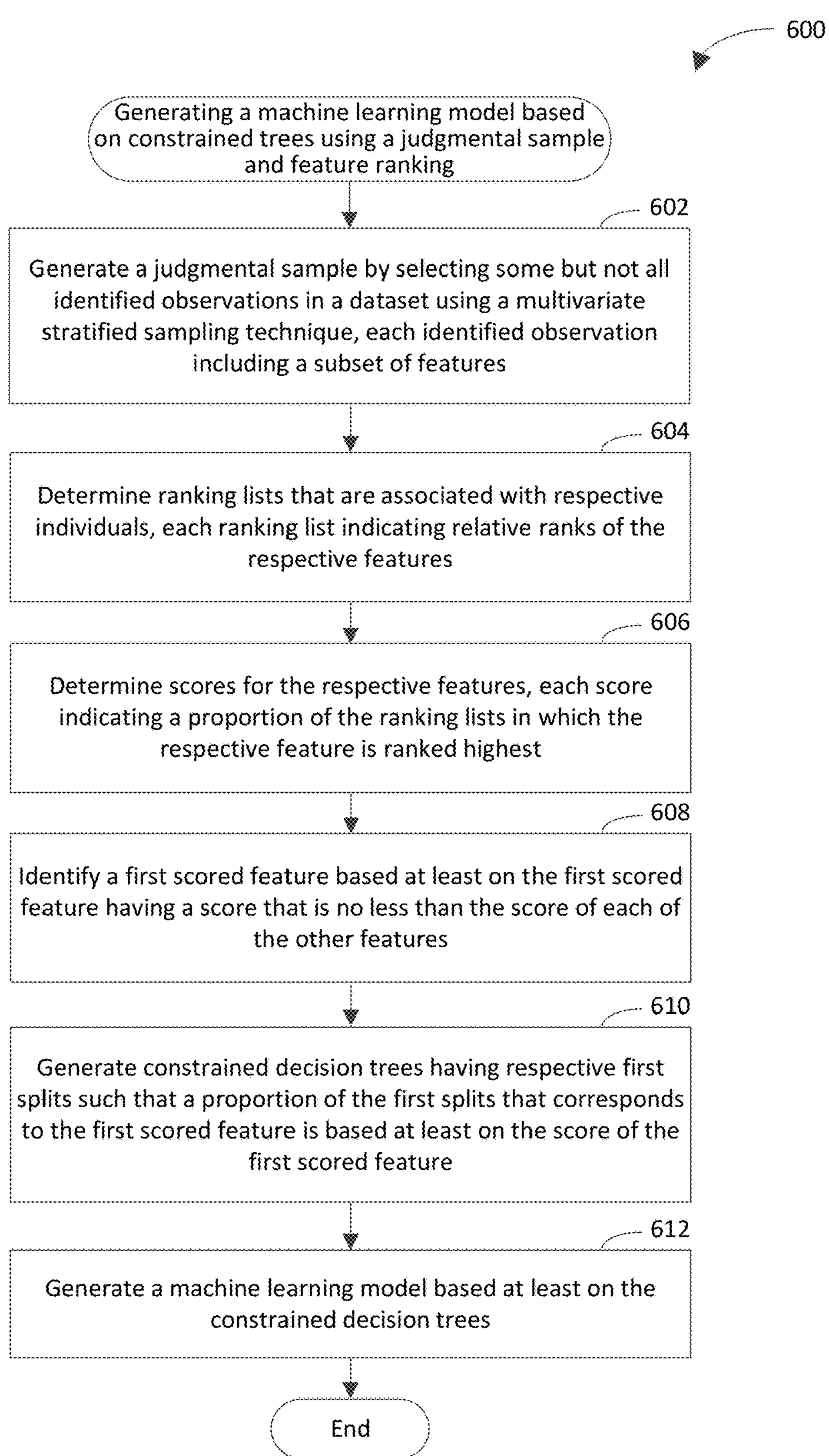
Figures 7, 8:
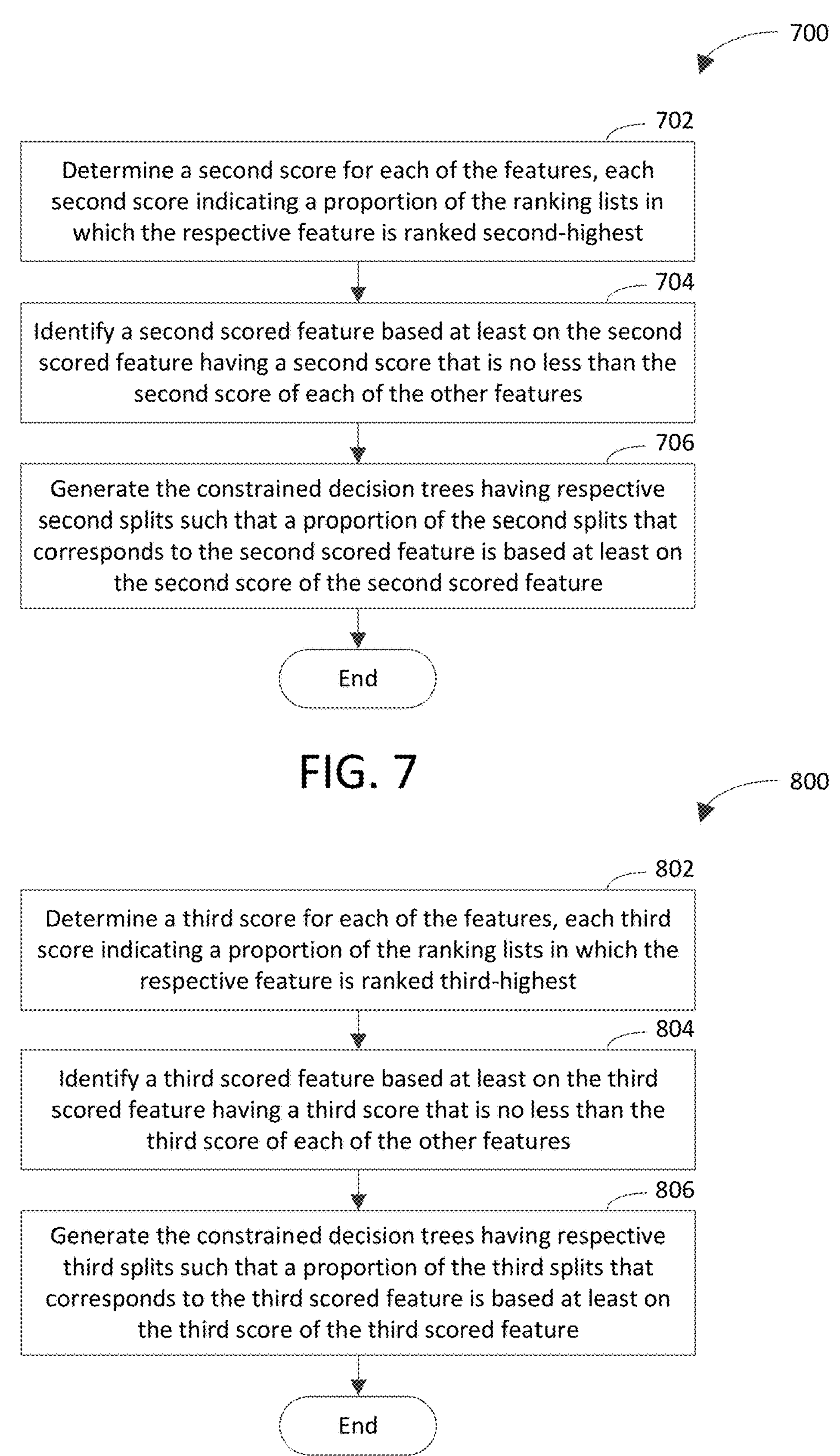

FIGS. 6-8 depict flowcharts 600, 700, and 800 of other example methods for generating a machine learning model based on constrained trees using a judgmental sample and feature ranking in accordance with an embodiment. Flowcharts 600, 700, and 800 may be performed by the first server(s) 106A shown in FIG. 1, for example. For illustrative purposes, flowcharts 600, 700, and 800 are described with respect to computing system 300 shown in FIG. 3, which is an example implementation of the first server(s) 106A. Further structural and operational embodiments will be apparent to persons skilled in the relevant art(s) based on the discussion regarding flowcharts 600, 700, and 800.

As shown in FIG. 6, the method of flowchart 600 begins at step 602. In step 602, a judgmental sample is generated by selecting some but not all identified observations in a dataset using a multivariate stratified sampling technique. Each identified observation includes a subset of features. The multivariate stratified sampling technique results in a proportion of each of multiple subsets of the features among the selected observations being the same as a proportion of the respective subset of the features among the identified observations.

In an example embodiment, generating the judgmental sample at step 602 further includes determining that a proportion of a selected observation among the selected observations is less than or equal to a proportion threshold. In accordance with this embodiment, generating the judgmental sample at step 602 further includes removing the selected observation from the judgmental sample based at least on the proportion of the selected observation among the selected observations being less than or equal to the proportion threshold.

In an example implementation, the multivariate stratified sampling logic 328 generates a judgmental sample 338 by selecting some but not all identified observations 332 in a dataset 330 using a multivariate stratified sampling technique. Each of the identified observations 332 includes a subset of features. The multivariate stratified sampling technique results in a proportion of each of multiple subsets of the features among the selected observations 340 being the same as a proportion of the respective subset of the features among the identified observations 332.

At step 604, ranking lists that are associated with respective individuals are determined. Each ranking list indicates relative ranks of the respective features. In an example implementation, the ranking determination logic 314 determines the ranking lists. In accordance with this implementation, the ranking determination logic 314 generates ranking information 342, which includes the ranking lists.

At step 606, scores for the respective features are determined. Each score indicates a proportion of the ranking lists in which the respective feature is ranked highest. In an example implementation, the scoring logic 316 determines the scores for the respective features. For instance, the scoring logic 316 may analyze the ranking information 342 to identify the highest-ranked feature in each ranking list. For each of the features, the scoring logic 316 may divide a number of the rankings lists in which the respective feature is ranked highest by a total number of the ranking lists to determine the score for the respective feature. In accordance with this implementation, the scoring logic 316 generates scoring information 344 to indicate the scores for the respective features. For instance, the scoring information 344 may cross-reference the scores with the respective features.

At step 608, a first scored feature is identified based at least on the first scored feature having a score that is no less than the score of each of the other features. In an example implementation, the feature identification logic 318 identifies the first scored feature. For instance, the feature identification logic 318 may analyze the scoring information 344 to determine the scores for the respective features. The feature identification logic 318 may compare the scores for the respective features to identify a score that is no less than the other scores. The feature identification logic 318 may analyze the scoring information 344 to cross-reference the score that is no less than the other scores with the corresponding feature, which is the first scored feature. In accordance with this implementation, the feature identification logic 318 generates feature identification information 346 to indicate the first scored feature and the score of the first scored feature.

At step 610, constrained decision trees having respective first splits are generated such that a proportion of the first splits that corresponds to the first scored feature is based at least on (e.g., selected to be equal to) the score of the first scored feature. The constrained decision trees are based at least on respective subsets of the selected observations. In an example implementation, the tree generation logic 302 generates constrained decision trees 348 based at least on respective subsets of the selected observations 340. The tree generation logic 302 generates the constrained decision trees 348 to have respective first splits such that a proportion of the first splits that corresponds to the first scored feature is based at least on the score of the first scored feature. In an aspect of this implementation, the tree generation logic 320 analyzes the feature identification information 346 to determine the first scored feature and the score of the first scored feature. In accordance with this aspect, the tree generation logic 320 configures a specified proportion of the constrained decision trees 348 to have a first split that corresponds to the first scored feature. The specified proportion is based at least on (e.g., equal to) the score of the first scored feature.

At step 612, a machine learning model is generated based at least on the constrained decision trees. In an example implementation, the model generation logic 322 generates the machine learning model 350 based at least on the constrained decision trees 348.

In some example embodiments, one or more steps 602, 604, 606, 608, 610, and/or 612 of flowchart 600 may not be performed. Moreover, steps in addition to or in lieu of steps 602, 604, 606, 608, 610, and/or 612 may be performed. For instance, in an example embodiment, the method of flowchart 600 further includes identifying a second scored feature based at least on the second scored feature has a score that is less than the score of the first scored feature and that is no less than the score of each of the other features, except for the first scored feature. In an example implementation, the feature identification logic 318 identifies the second scored feature. For instance, the feature identification logic 318 may analyze the scoring information 344 to determine the scores for the respective features. The feature identification logic 318 may compare the scores for the respective features to identify a second score that is less than the score of the first scored feature and that is no less than the score of each of the other features, except for the first scored feature. The feature identification logic 318 may analyze the scoring information 344 to cross-reference the second score with the corresponding feature, which is the second scored feature. In accordance with this implementation, the feature identification information 346, which is generated by the feature identification logic 318, indicates the second scored feature and the second score of the second scored feature. In accordance with this embodiment, the constrained decision trees are generated at step 610 such that a proportion of the first splits that corresponds to the second scored feature is based at least on (e.g., selected to be equal to) the second score of the second scored feature. In an example implementation, the tree generation logic 320 generates the constrained decision trees 348 such that the proportion of the first splits that corresponds to the second scored feature is based at least on the second score of the second scored feature.

In another example embodiment, the method of flowchart 600 further includes, for each selected observation, aggregating multiple fuzzy labels indicating respective non-binary scores assigned to the respective selected observation to provide a respective aggregated fuzzy label indicating a likelihood of a designated result of the respective selected observation. Each plurality of fuzzy labels is associated with the respective individuals. For instance, aggregating the fuzzy labels may include calculating an average of the fuzzy labels or calculating a mode of the fuzzy labels. In accordance with this embodiment, the label aggregation logic 324 receives fuzzy labels 334, which include a plurality of fuzzy labels for each of the selected observations 340. In further accordance with this embodiment, for each of the selected observations 340, the label aggregation logic 324 aggregates the plurality of fuzzy labels indicating the plurality of respective non-binary scores assigned to the respective selected observation to provide a respective aggregated fuzzy label indicating a likelihood of a designated result of the respective selected observation. In this manner, the label aggregation logic 324 generates the aggregated fuzzy labels 352 for the respective selected observations 340. In further accordance with this embodiment, the constrained decision trees are generated at step 610 further such that the constrained decision trees generate respective predictions that are based on respective subsets of the aggregated fuzzy labels. For instance, the tree generation logic 320 may generate the constrained decision trees 348 further such that the constrained decision trees 348 generate respective predictions that are based on respective subsets of the aggregated fuzzy labels 352. In further accordance with this embodiment, generating the machine learning model at step 612 includes configuring the machine learning model to have an output that corresponds to an aggregation of the predictions that are generated by the respective constrained decision trees. For instance, the model generation logic 320 may configure the machine learning model 350 to have an output that corresponds to an aggregation of the predictions that are generated by the respective constrained decision trees 348.

In an aspect of this embodiment, the method of flowchart 600 further includes identifying each of the identified observations that has a similarity to a specified selected observation that is greater than or equal to a similarity threshold. In an example implementation, the similarity determination logic 326 identifies each of the identified observations 332 that has a similarity to the specified selected observation that is greater than or equal to the similarity threshold. In accordance with this implementation, the similarity determination logic 326 generates a label assignment instruction 336 that instructs the tree generation logic 320 to assign the aggregated fuzzy label of the specified selected observation to each of the identified observations 332 that has a similarity to the specified selected observation that is greater than or equal to the similarity threshold. In further accordance with this aspect, the method of flowchart 600 further includes assigning (e.g., propagating) the aggregated fuzzy label of the specified selected observation to each of the identified observations that has a similarity to the specified selected observation that is greater than or equal to the similarity threshold. In an example implementation, the tree generation logic 320 assigns the aggregated fuzzy label of the specified selected observation to each of the identified observations 332 that has a similarity to the specified selected observation that is greater than or equal to the similarity threshold based on receipt of the label assignment instruction 336 (e.g., based on the label assignment instruction 336 instructing the tree generation logic 320 to assign the aggregated fuzzy label of the specified selected observation to each of the identified observations 332 that has a similarity to the specified selected observation that is greater than or equal to the similarity threshold).

It will be recognized that the actions in this aspect may be performed for any one or more of the selected observations. For example, the method of flowchart 600 may further include, for each of the selected observations, identifying each of the identified observations that has a similarity to the respective selected observation that is greater than or equal to a similarity threshold. In accordance with this example, the method of flowchart 600 may further include, for each of the selected observations, assigning the aggregated fuzzy label of the respective selected observation to each of the identified observations that has a similarity to the respective selected observation that is greater than or equal to the similarity threshold.

In yet another example embodiment, the method of flowchart 600 further includes one or more of the steps shown in flowchart 400 of FIG. 4, which is described above.

In still another example embodiment, the method of flowchart 600 includes one or more of the steps shown in flowchart 700 of FIG. 7. As shown in FIG. 7, the method of flowchart 700 begins at step 702. In step 702, a second score is determined for each of the features. Each second score indicates a proportion of the ranking lists in which the respective feature is ranked second-highest. In an example implementation, the scoring logic 316 determines the second score for each of the features. For instance, the scoring logic 316 may analyze the ranking information 342 to identify the feature that is ranked second-highest in each ranking list. For each feature, the scoring logic 316 may divide a number of the rankings lists in which the respective feature is ranked second-highest by a total number of the ranking lists to determine the second score for the respective feature. In accordance with this implementation, the scoring information 344, which is generated by the scoring logic 316, indicates the second scores for the respective features.

At step 704, a second scored feature is identified based at least on the second scored feature having a second score that is no less than the second score of each of the other features. In an example implementation, the feature identification logic 318 identifies the second scored feature. For instance, the feature identification logic 318 may analyze the scoring information 344 to determine the second scores for the respective features. The feature identification logic 318 may compare the second scores for the respective features to identify a second score that is no less than the other second scores. The feature identification logic 318 may analyze the scoring information 344 to cross-reference the second score that is no less than the other second scores with the corresponding feature, which is the second scored feature. In accordance with this implementation, the feature identification logic 318 generates feature identification information 346 to indicate the second scored feature and the second score of the second scored feature.

At step 706, the constrained decision trees having respective second splits are generated such that a proportion of the second splits that corresponds to the second scored feature is based at least on (e.g., selected to be equal to) the second score of the second scored feature. In an example implementation, the tree generation logic 302 generates the constrained decision trees 348 to have respective second splits such that a proportion of the second splits that corresponds to the second scored feature is based at least on the second score of the second scored feature. In an aspect of this implementation, the tree generation logic 320 analyzes the feature identification information 346 to determine the second scored feature and the second score of the second scored feature. In accordance with this aspect, the tree generation logic 320 configures a second specified proportion of the constrained decision trees 348 to have a second split that corresponds to the second scored feature. The second specified proportion is based at least on (e.g., equal to) the second score of the second scored feature.

In an aspect of this embodiment, the method of flowchart 600 includes one or more of the steps shown in flowchart 800 of FIG. 8. As shown in FIG. 8, the method of flowchart 800 begins at step 802. In step 802, a third score is determined for each of the features. Each third score indicates a proportion of the ranking lists in which the respective feature is ranked third-highest. In an example implementation, the scoring logic 316 determines the third scores for the respective features. For instance, the scoring logic 316 may analyze the ranking information 342 to identify the feature that is ranked third-highest in each ranking list. For each feature, the scoring logic 316 may divide a number of the rankings lists in which the respective feature is ranked third-highest by a total number of the ranking lists to determine the third score for the respective feature. In accordance with this implementation, the scoring information 344, which is generated by the scoring logic 316, indicates the third scores for the respective features.

At step 804, a third scored feature is identified based at least on the third scored feature having a third score that is no less than the third score of each of the other features. In an example implementation, the feature identification logic 318 identifies the third scored feature. For instance, the feature identification logic 318 may analyze the scoring information 344 to determine the third scores for the respective features. The feature identification logic 318 may compare the third scores for the respective features to identify a third score that is no less than the other third scores. The feature identification logic 318 may analyze the scoring information 344 to cross-reference the third score that is no less than the other third scores with the corresponding feature, which is the third scored feature. In accordance with this implementation, the feature identification logic 318 generates feature identification information 346 to indicate the third scored feature and the third score of the third scored feature.

At step 806, the constrained decision trees having respective third splits are generated such that a proportion of the third splits that corresponds to the third scored feature is based at least on (e.g., selected to be equal to) the third score of the third scored feature. In an example implementation, the tree generation logic 302 generates the constrained decision trees 348 to have respective third splits such that a proportion of the third splits that corresponds to the third scored feature is based at least on the third score of the third scored feature. In an aspect of this implementation, the tree generation logic 320 analyzes the feature identification information 346 to determine the third scored feature and the third score of the third scored feature. In accordance with this aspect, the tree generation logic 320 configures a third specified proportion of the constrained decision trees 348 to have a third split that corresponds to the third scored feature. The third specified proportion is based at least on (e.g., equal to) the third score of the third scored feature.

It will be recognized that the computing system 300 may not include one or more of the constrained tree-based ML model logic 308, the sample generation logic 312, the ranking determination logic 314, the scoring logic 316, the feature identification logic 318, the tree generation logic 320, the model generation logic 322, the label aggregation logic 324, the similarity determination logic 326, and/or the multivariate stratified sampling logic 328. Furthermore, the computing system 300 may include components in addition to or in lieu of the constrained tree-based ML model logic 308, the sample generation logic 312, the ranking determination logic 314, the scoring logic 316, the feature identification logic 318, the tree generation logic 320, the model generation logic 322, the label aggregation logic 324, the similarity determination logic 326, and/or the multivariate stratified sampling logic 328.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the constrained tree-based ML model logic 108, the constrained tree-based ML model logic 308, the sample generation logic 312, the ranking determination logic 314, the scoring logic 316, the feature identification logic 318, the tree generation logic 320, the model generation logic 322, the label aggregation logic 324, the similarity determination logic 326, the multivariate stratified sampling logic 328, the proportion comparison logic 502, the importance determination logic 504, the proportion updating logic 506, flowchart 200, flowchart 400, and/or flowchart 600 may be implemented in hardware, software, firmware, or any combination thereof.

For example, any one or more of the constrained tree-based ML model logic 108, the constrained tree-based ML model logic 308, the sample generation logic 312, the ranking determination logic 314, the scoring logic 316, the feature identification logic 318, the tree generation logic 320, the model generation logic 322, the label aggregation logic 324, the similarity determination logic 326, the multivariate stratified sampling logic 328, the proportion comparison logic 502, the importance determination logic 504, the proportion updating logic 506, flowchart 200, flowchart 400, and/or flowchart 600 may be implemented, at least in part, as computer program code configured to be executed in one or more processors.

In another example, any one or more of the constrained tree-based ML model logic 108, the constrained tree-based ML model logic 308, the sample generation logic 312, the ranking determination logic 314, the scoring logic 316, the feature identification logic 318, the tree generation logic 320, the model generation logic 322, the label aggregation logic 324, the similarity determination logic 326, the multivariate stratified sampling logic 328, the proportion comparison logic 502, the importance determination logic 504, the proportion updating logic 506, flowchart 200, flowchart 400, and/or flowchart 600 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 9:
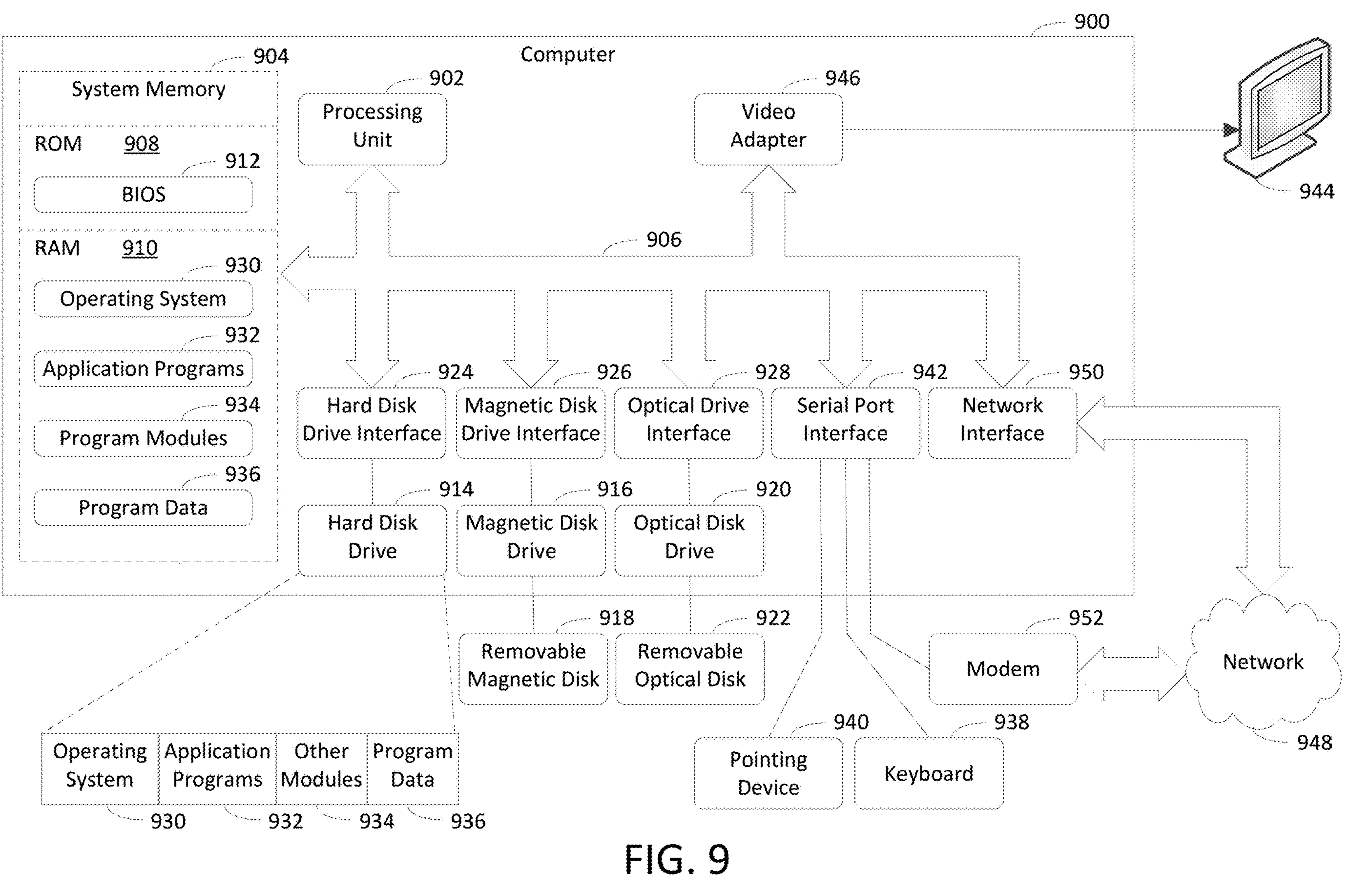
FIG. 9 depicts an example computer in which embodiments may be implemented.

II. Further Discussion of Some Example Embodiments (A1) A first example system (FIG. 1, 102A-102M, 106A-106N; FIG. 3, 300; FIG. 9, 900) comprises a memory (FIG. 9, 904, 908, 910) and a processing system (FIG. 9, 902) coupled to the memory. The processing system is configured to generate (FIG. 6, 602) a judgmental sample by selecting some but not all identified observations (FIG. 3, 332) in a dataset (FIG. 3, 330) using a multivariate stratified sampling technique. Each identified observation includes a subset of features. The multivariate stratified sampling technique results in a proportion of each of multiple subsets of the features among the selected observations (FIG. 3, 340) being the same as a proportion of the respective subset of the features among the identified observations. The processing system is further configured to determine (FIG. 6, 604) ranking lists that are associated with respective individuals. Each ranking list indicates relative ranks of the respective features. The processing system is further configured to determine (FIG. 6, 606) scores for the respective features. Each score indicates a proportion of the ranking lists in which the respective feature is ranked highest. The processing system is further configured to identify (FIG. 6, 608) a first scored feature based at least on the first scored feature having a score that is no less than the score of each of the other features. The processing system is further configured to generate (FIG. 6, 610) constrained decision trees (FIG. 3, 348) having respective first splits such that a proportion of the first splits that corresponds to the first scored feature is based at least on the score of the first scored feature. The constrained decision trees are based at least on respective subsets of the selected observations. The processing system is further configured to generate (FIG. 6, 612) a machine learning model (FIG. 3, 350) based at least on the constrained decision trees.

(A2) In the example system of A1, wherein the processing system is configured to: identify a second scored feature based at least on the second scored feature having a score that is less than the score of the first scored feature and that is no less than the score of each of the other features, except for the first scored feature; and generate the constrained decision trees having the respective first splits such that a proportion of the first splits that corresponds to the second scored feature is based at least on the score of the second scored feature.

(A3) In the example system of any of A1-A2, wherein the processing system is configured to: determine a second score for each of the features, each second score indicating a proportion of the ranking lists in which the respective feature is ranked second-highest; identify a second scored feature based at least on the second scored feature having a second score that is no less than the second score of each of the other features; and generate the constrained decision trees having respective second splits such that a proportion of the second splits that corresponds to the second scored feature is based at least on the second score of the second scored feature.

(A4) In the example system of any of A1-A3, wherein the processing system is configured to: determine a third score for each of the features, each third score indicating a proportion of the ranking lists in which the respective feature is ranked third-highest; identify a third scored feature based at least on the third scored feature having a third score that is no less than the third score of each of the other features; and generate the constrained decision trees having respective third splits such that a proportion of the third splits that corresponds to the third scored feature is based at least on the third score of the third scored feature.

(A5) In the example system of any of A1-A4, wherein the processing system is configured to: for each selected observation, aggregate a plurality of fuzzy labels indicating a plurality of respective non-binary scores assigned to the respective selected observation to provide a respective aggregated fuzzy label indicating a likelihood of a designated result of the respective selected observation, wherein each plurality of fuzzy labels is associated with the respective individuals; generate the constrained decision trees further such that the constrained decision trees generate respective predictions that are based at least on respective subsets of the aggregated fuzzy labels; and configure the machine learning model to have an output that corresponds to an aggregation of the predictions that are generated by the respective constrained decision trees.

(A6) In the example system of any of A1-A5, wherein the processing system is further configured to: identify each of the identified observations that has a similarity to a specified selected observation that is greater than or equal to a similarity threshold; and assign the aggregated fuzzy label of the specified selected observation to each of the identified observations that has a similarity to the specified selected observation that is greater than or equal to the similarity threshold.

(A7) In the example system of any of A1-A6, wherein the processing system is configured to: determine that the proportion of a designated subset of the features among the selected observations, which is the same as the proportion of the designated subset of features among the identified observations, is less than or equal to a proportion threshold; determine that an importance of the designated subset of the features is greater than or equal to an importance threshold; and based at least on the importance of the designated subset of the features being greater than or equal to the importance threshold, increase the proportion of the designated subset of the features among the selected observations to be greater than the proportion of the designated subset of the features among the identified observations and to be greater than the proportion threshold.

(A8) In the example system of any of A1-A7, wherein the processing system is configured to: determine that a proportion of a selected observation among the selected observations is less than or equal to a proportion threshold; and remove the selected observation from the judgmental sample based at least on the proportion of the selected observation among the selected observations being less than or equal to the proportion threshold.

(B1) A second example system (FIG. 1, 102A-102M, 106A-106N; FIG. 3, 300; FIG. 9, 900) comprises a memory (FIG. 9, 904, 908, 910) and a processing system (FIG. 9, 902) coupled to the memory. The processing system is configured to generate (FIG. 2, 202) a judgmental sample that includes selected observations (FIG. 3, 340). Each selected observation includes a respective combination of features from a plurality of features. The judgmental sample is generated by selecting the selected observations from identified observations (FIG. 3, 332) in a dataset (FIG. 3, 330) using a multivariate stratified sampling technique that causes a proportion of each combination of features among the selected observations to be same as a proportion of the respective combination of features among the identified observations. The selected observations include fewer than all of the identified observations. The processing system is further configured to determine (FIG. 2, 204) subsets of the plurality of features based at least in part on each subset being designated as more important than the other features of the plurality of features by a respective human of a plurality of humans. The processing system is further configured to determine (FIG. 2, 206) a proportional score for each feature of the plurality of features. Each proportional score indicates a proportion of the plurality of humans that included the respective feature in the subset of the plurality of features that is designated by the respective human. The processing system is further configured to identify (FIG. 2, 208) a highest scored feature of the plurality of features, the highest scored feature having a proportional score that is no less than the proportional score of each other feature in the plurality of features. The processing system is further configured to generate (FIG. 2, 210) a plurality of constrained decision trees (FIG. 3, 348) having a plurality of respective first splits such that a proportion of the first splits that corresponds to the highest scored feature is based at least in part on the proportional score of the highest scored feature, the plurality of constrained decision trees are based at least in part on respective subsets of the selected observations. The processing system is further configured to generate (FIG. 2, 212) a machine learning model (FIG. 3, 350) based at least in part on the plurality of constrained decision trees.

(B2) In the example system of B1, wherein the processing system is configured to: for each selected observation, aggregate a plurality of fuzzy labels indicating a plurality of respective non-binary scores assigned to the respective selected observation by the plurality of respective humans to provide a respective aggregated fuzzy label indicating a likelihood of a designated result of the respective selected observation; generate the plurality of constrained decision trees further such that the plurality of constrained decision trees generates a plurality of respective predictions that are based at least in part on respective subsets of the aggregated fuzzy labels; and configure the machine learning model to have an output that corresponds to an aggregation of the plurality of predictions that are generated by the plurality of respective constrained decision trees.

(B3) In the example system of any of B1-B2, wherein the processing system is further configured to: identify each of the identified observations that has a similarity to a specified selected observation that is greater than or equal to a similarity threshold; and assign the aggregated fuzzy label of the specified selected observation to each of the identified observations that has a similarity to the specified selected observation that is greater than or equal to the similarity threshold.

(B4) In the example system of any of B1-B3, wherein the processing system is further configured to: for each of the selected observations, identify each of the identified observations that has a similarity to the respective selected observation that is greater than or equal to a similarity threshold; and for each of the selected observations, assign the aggregated fuzzy label of the respective selected observation to each of the identified observations that has a similarity to the respective selected observation that is greater than or equal to the similarity threshold.

(B5) In the example system of any of B1-B4, wherein the processing system is configured to: determine that the proportion of a designated combination of features among the selected observations, which is the same as the proportion of the designated combination of features among the identified observations, is less than or equal to a proportion threshold; determine that an importance of the designated combination of features is greater than or equal to an importance threshold; and based at least in part on the importance of the designated combination of features being greater than or equal to the importance threshold, increase the proportion of the designated combination of features among the selected observations to be greater than the proportion of the designated combination of features among the identified observations and to be greater than the proportion threshold.

(B6) In the example system of any of B1-B5, wherein the processing system is configured to: determine that a proportion of a selected observation among the selected observations is less than or equal to a proportion threshold; and remove the selected observation from the judgmental sample based at least in part on the proportion of the selected observation among the selected observations being less than or equal to the proportion threshold.

(B7) In the example system of any of B1-B6, wherein the processing system is further configured to: identify a second-highest scored feature of the plurality of features, the second-highest scored feature having a proportional score that is less than the proportional score of the highest scored feature and no less than the proportional score of each other feature, except for the highest scored feature, in the plurality of features; and wherein a proportion of the first splits that corresponds to the second-highest scored feature is based at least in part on the proportional score of the second-highest scored feature.

(B8) In the example system of any of B1-B7, wherein each subset of the plurality of features includes a respective single feature of the plurality of features that is designated as being more important than the other features of the plurality of features by the respective human of the plurality of humans; and wherein each proportional score indicates a proportion of the plurality of humans that designated the respective feature as being more important than the other features of the plurality of features.

(C1) A third example system (FIG. 1, 102A-102M, 106A-106N; FIG. 3, 300; FIG. 9, 900) comprises a memory (FIG. 9, 904, 908, 910) and a processing system (FIG. 9, 902) coupled to the memory. The processing system is configured to generate (FIG. 6, 602) a judgmental sample that includes selected observations (FIG. 3, 340), each selected observation including a respective combination of features from a plurality of features. The judgmental sample is generated by selecting the selected observations from identified observations (FIG. 3, 332) in a dataset (FIG. 3, 330) using a multivariate stratified sampling technique that causes a proportion of each combination of features among the selected observations to be same as a proportion of the respective combination of features among the identified observations. The selected observations include fewer than all of the identified observations. The processing system is further configured to determine (FIG. 6, 604) a plurality of ranking lists that are associated with a plurality of respective humans. Each ranking list indicates a first rank that is assigned to a respective feature of the plurality of features. The first rank indicates that the respective feature ranks higher in the ranking list than each other feature of the plurality of features. The processing system is further configured to determine (FIG. 6, 606) a proportional score for each feature of the plurality of features. Each proportional score indicates a proportion of the plurality of ranking lists indicating that the first rank is assigned to the respective feature. The processing system is further configured to identify (FIG. 6, 608) a first scored feature of the plurality of features. The first scored feature has a proportional score that is no less than the proportional score of each other feature in the plurality of features. The processing system is further configured to generate (FIG. 6, 610) a plurality of constrained decision trees (FIG. 3, 348) having a plurality of respective first splits such that a proportion of the first splits that correspond to the first scored feature is based at least in part on the proportional score of the first scored feature. The plurality of constrained decision trees are based at least in part on respective subsets of the selected observations. The processing system is further configured to generate (FIG. 6, 612) a machine learning model (FIG. 3, 350) based at least in part on the plurality of constrained decision trees.

(C2) In the example system of C1, wherein the processing system is configured to: identify a second scored feature of the plurality of features, the second scored feature having a proportional score that is less than the proportional score of the first scored feature and that is no less than the proportional score of each other feature, except for the first scored feature, in the plurality of features; and generate the plurality of constrained decision trees having the plurality of respective first splits such that a proportion of the first splits that corresponds to the second scored feature is based at least in part on the proportional score of the second scored feature.

(C3) In the example system of any of C1-C2, wherein each ranking list further indicates a second rank that is assigned to a respective feature of the plurality of features, the second rank indicating that the respective feature ranks higher in the ranking list than each other feature of the plurality of features, except for the respective feature to which the first rank is assigned; and wherein the processing system is configured to: determine a second proportional score for each feature of the plurality of features, each second proportional score indicating a proportion of the plurality of ranking lists indicating that the second rank is assigned to the respective feature; identify a second scored feature of the plurality of features, the second scored feature having a second proportional score that is no less than the second proportional score of each other feature in the plurality of features; and generate the plurality of constrained decision trees having a plurality of respective second splits such that a proportion of the second splits that corresponds to the second scored feature is based at least in part on the second proportional score of the second scored feature.

(C4) In the example system of any of C1-C3, wherein each ranking list further indicates a third rank that is assigned to a respective feature of the plurality of features, the third rank indicating that the respective feature ranks higher in the ranking list than each other feature of the plurality of features, except for the respective feature to which the first rank is assigned and the respective feature to which the second rank is assigned; and wherein the processing system is configured to: determine a third proportional score for each feature of the plurality of features, each third proportional score indicating a proportion of the plurality of ranking lists indicating that the third rank is assigned to the respective feature; identify a third scored feature of the plurality of features, the third scored feature having a third proportional score that is no less than the third proportional score of each other feature in the plurality of features; and generate the plurality of constrained decision trees having a plurality of respective third splits such that a proportion of the third splits that corresponds to the third scored feature is based at least in part on the third proportional score of the third scored feature.

(C5) In the example system of any of C1-C4, wherein the processing system is configured to: for each selected observation, aggregate a plurality of fuzzy labels indicating a plurality of respective non-binary scores assigned to the respective selected observation to provide a respective aggregated fuzzy label indicating a likelihood of a designated result of the respective selected observation, wherein each plurality of fuzzy labels is associated with the plurality of respective humans; generate the plurality of constrained decision trees further such that the plurality of constrained decision trees generates a plurality of respective predictions that are based at least in part on respective subsets of the aggregated fuzzy labels; and configure the machine learning model to have an output that corresponds to an aggregation of the plurality of predictions that are generated by the plurality of respective constrained decision trees.

(C6) In the example system of any of C1-05, wherein the processing system is further configured to: identify each of the identified observations that has a similarity to a specified selected observation that is greater than or equal to a similarity threshold; and assign the aggregated fuzzy label of the specified selected observation to each of the identified observations that has a similarity to the specified selected observation that is greater than or equal to the similarity threshold.

(C7) In the example system of any of C1-C6, wherein the processing system is further configured to: for each of the selected observations, identify each of the identified observations that has a similarity to the respective selected observation that is greater than or equal to a similarity threshold; and for each of the selected observations, assign the aggregated fuzzy label of the respective selected observation to each of the identified observations that has a similarity to the respective selected observation that is greater than or equal to the similarity threshold.

(C8) In the example system of any of C1-C7, wherein the processing system is configured to: determine that the proportion of a designated combination of features among the selected observations, which is the same as the proportion of the designated combination of features among the identified observations, is less than or equal to a proportion threshold; determine that an importance of the designated combination of features is greater than or equal to an importance threshold; and based at least in part on the importance of the designated combination of features being greater than or equal to the importance threshold, increase the proportion of the designated combination of features among the selected observations to be greater than the proportion of the designated combination of features among the identified observations and to be greater than the proportion threshold.

(C9) In the example system of any of C1-C8, wherein the processing system is configured to: determine that a proportion of a selected observation among the selected observations is less than or equal to a proportion threshold; and remove the selected observation from the judgmental sample based at least in part on the proportion of the selected observation among the selected observations being less than or equal to the proportion threshold.

(D1) A first example method is implemented by a computing system (FIG. 1, 102A-102M, 106A-106N; FIG. 3, 300; FIG. 9, 900). The method comprises generating (FIG. 2, 202) a judgmental sample by selecting some but not all identified observations (FIG. 3, 332) in a dataset (FIG. 3, 330) using a multivariate stratified sampling technique. Each identified observation includes a subset of features. The multivariate stratified sampling technique results in a proportion of each of multiple subsets of the features among the selected observations being the same as a proportion of the respective subset of the features among the identified observations. The method further comprises determining (FIG. 2, 204) important subsets of the features based at least on each important subset being designated as more important than the other features by a respective individual. The method further comprises determining (FIG. 2, 206) scores for the respective features, each score indicating a proportion of the important subsets of the features that includes the respective feature. The method further comprises identifying (FIG. 2, 208) a highest scored feature based at least on the highest scored feature having a score that is no less than the score of each of the other features. The method further comprises generating (FIG. 2, 210) constrained decision trees having respective first splits such that a proportion of the first splits that corresponds to the highest scored feature is based at least on the score of the highest scored feature, the constrained decision trees are based at least on respective subsets of the selected observations. The method further comprises generating (FIG. 2, 212) a machine learning model based at least on the constrained decision trees.

(D2) In the method of D1, further comprising: for each selected observation, aggregating a plurality of fuzzy labels indicating a plurality of respective non-binary scores assigned to the respective selected observation by the respective individuals to provide a respective aggregated fuzzy label indicating a likelihood of a designated result of the respective selected observation; wherein generating the constrained decision trees comprises: generating the constrained decision trees further such that the constrained decision trees generate respective predictions that are based at least on respective subsets of the aggregated fuzzy labels; and wherein generating the machine learning model comprises: configuring the machine learning model to have an output that corresponds to an aggregation of the predictions that are generated by the respective constrained decision trees.

(D3) In the method of any of D1-D2, further comprising: for each of the selected observations, identifying each of the identified observations that has a similarity to the respective selected observation that is greater than or equal to a similarity threshold; and for each of the selected observations, assigning the aggregated fuzzy label of the respective selected observation to each of the identified observations that has a similarity to the respective selected observation that is greater than or equal to the similarity threshold.

(D4) In the method of any of D1-D3, wherein generating the judgmental sample further comprises: determining that the proportion of a designated subset of the features among the selected observations, which is the same as the proportion of the designated subset of the features among the identified observations, is less than or equal to a proportion threshold; determining that an importance of the designated subset of the features is greater than or equal to an importance threshold; and based at least on the importance of the designated subset of the features being greater than or equal to the importance threshold, increasing the proportion of the designated subset of the features among the selected observations to be greater than the proportion of the designated subset of the features among the identified observations and to be greater than the proportion threshold.

(D5) In the method of any of D1-D4, wherein generating the judgmental sample further comprises: determining that a proportion of a selected observation among the selected observations is less than or equal to a proportion threshold; and removing the selected observation from the judgmental sample based at least on the proportion of the selected observation among the selected observations being less than or equal to the proportion threshold.

(D6) In the method of any of D1-D5, further comprising: identifying a second-highest scored feature based at least on the second-highest scored feature having a score that is less than the score of the highest scored feature and no less than the score of each of the other features, except for the highest scored feature; wherein a proportion of the first splits that corresponds to the second-highest scored feature is based at least on the score of the second-highest scored feature.

(D7) In the method of any of D1-D6, wherein each important subset of the features includes a respective single feature that is designated as being more important than the other features by the respective individual.

(E1) A second example method is implemented by a computing system (FIG. 1, 102A-102M, 106A-106N; FIG. 3, 300; FIG. 9, 900). The method comprises generating (FIG. 2, 202) a judgmental sample that includes selected observations (FIG. 3, 340). Each selected observation includes a respective combination of features from a plurality of features. Said generating the judgmental sample comprises selecting the selected observations from identified observations (FIG. 3, 332) in a dataset (FIG. 3, 330) using a multivariate stratified sampling technique that causes a proportion of each combination of features among the selected observations to be same as a proportion of the respective combination of features among the identified observations. The selected observations include fewer than all of the identified observations. The method further comprises determining (FIG. 2, 204) subsets of the plurality of features based at least in part on each subset being designated as more important than the other features of the plurality of features by a respective human of a plurality of humans. The method further comprises determining (FIG. 2, 206) a proportional score for each feature of the plurality of features. Each proportional score indicates a proportion of the plurality of humans that included the respective feature in the subset of the plurality of features that is designated by the respective human. The method further comprises identifying (FIG. 2, 208) a highest scored feature of the plurality of features. The highest scored feature has a proportional score that is no less than the proportional score of each other feature in the plurality of features. The method further comprises generating (FIG. 2, 210) a plurality of constrained decision trees (FIG. 3, 348) having a plurality of respective first splits such that a proportion of the first splits that corresponds to the highest scored feature is based at least in part on the proportional score of the highest scored feature. The plurality of constrained decision trees are based at least in part on respective subsets of the selected observations. The method further comprises generating (FIG. 2, 212) a machine learning model (FIG. 3, 350) based at least in part on the plurality of constrained decision trees.

(E2) In the method of E1, further comprising: for each selected observation, aggregating a plurality of fuzzy labels indicating a plurality of respective non-binary scores assigned to the respective selected observation by the plurality of respective humans to provide a respective aggregated fuzzy label indicating a likelihood of a designated result of the respective selected observation; wherein generating the plurality of constrained decision trees comprises: generating the plurality of constrained decision trees further such that the plurality of constrained decision trees generates a plurality of respective predictions that are based at least in part on respective subsets of the aggregated fuzzy labels; and wherein generating the machine learning model comprises: configuring the machine learning model to have an output that corresponds to an aggregation of the plurality of predictions that are generated by the plurality of respective constrained decision trees.

(E3) In the method of any of E1-E2, further comprising: identifying each of the identified observations that has a similarity to a specified selected observation that is greater than or equal to a similarity threshold; and assigning the aggregated fuzzy label of the specified selected observation to each of the identified observations that has a similarity to the specified selected observation that is greater than or equal to the similarity threshold.

(E4) In the method of any of E1-E3, further comprising: for each of the selected observations, identifying each of the identified observations that has a similarity to the respective selected observation that is greater than or equal to a similarity threshold; and for each of the selected observations, assigning the aggregated fuzzy label of the respective selected observation to each of the identified observations that has a similarity to the respective selected observation that is greater than or equal to the similarity threshold.

(E5) In the method of any of E1-E4, wherein generating the judgmental sample further comprises: determining that the proportion of a designated combination of features among the selected observations, which is the same as the proportion of the designated combination of features among the identified observations, is less than or equal to a proportion threshold; determining that an importance of the designated combination of features is greater than or equal to an importance threshold; and based at least in part on the importance of the designated combination of features being greater than or equal to the importance threshold, increasing the proportion of the designated combination of features among the selected observations to be greater than the proportion of the designated combination of features among the identified observations and to be greater than the proportion threshold.

(E6) In the method of any of E1-E5, wherein generating the judgmental sample further comprises: determining that a proportion of a selected observation among the selected observations is less than or equal to a proportion threshold; and removing the selected observation from the judgmental sample based at least in part on the proportion of the selected observation among the selected observations being less than or equal to the proportion threshold.

(E7) In the method of any of E1-E6, further comprising: identifying a second-highest scored feature of the plurality of features, the second-highest scored feature having a proportional score that is less than the proportional score of the highest scored feature and no less than the proportional score of each other feature, except for the highest scored feature, in the plurality of features; wherein a proportion of the first splits that corresponds to the second-highest scored feature is based at least in part on the proportional score of the second-highest scored feature.

(E8) In the method of any of E1-E7, wherein each subset of the plurality of features includes a respective single feature of the plurality of features that is designated as being more important than the other features of the plurality of features by the respective human of the plurality of humans; and wherein each proportional score indicates a proportion of the plurality of humans that designated the respective feature as being more important than the other features of the plurality of features.

(F1) A third example method is implemented by a computing system (FIG. 1, 102A-102M, 106A-106N; FIG. 3, 300; FIG. 9, 900). The method comprises generating (FIG. 6, 602) a judgmental sample that includes selected observations (FIG. 3, 340). Each selected observation includes a respective combination of features from a plurality of features, said generating the judgmental sample comprising selecting the selected observations from identified observations (FIG. 3, 332) in a dataset (FIG. 3, 330) using a multivariate stratified sampling technique that causes a proportion of each combination of features among the selected observations to be same as a proportion of the respective combination of features among the identified observations. The selected observations include fewer than all of the identified observations. The method further comprises determining (FIG. 6, 604) a plurality of ranking lists that are associated with a plurality of respective humans. Each ranking list indicates a first rank that is assigned to a respective feature of the plurality of features. The first rank indicates that the respective feature ranks higher in the ranking list than each other feature of the plurality of features. The method further comprises determining (FIG. 6, 606) a proportional score for each feature of the plurality of features. Each proportional score indicates a proportion of the plurality of ranking lists indicating that the first rank is assigned to the respective feature. The method further comprises identifying (FIG. 6, 608) a first scored feature of the plurality of features. The first scored feature has a proportional score that is no less than the proportional score of each other feature in the plurality of features. The method further comprises generating (FIG. 6, 610) a plurality of constrained decision trees (FIG. 3, 348) having a plurality of respective first splits such that a proportion of the first splits that corresponds to the first scored feature is based at least in part on the proportional score of the first scored feature. The plurality of constrained decision trees are based at least in part on respective subsets of the selected observations. The method further comprises generating (FIG. 6, 612) a machine learning model (FIG. 3, 350) based at least in part on the plurality of constrained decision trees.

(F2) In the method of F1, further comprising: identifying a second scored feature of the plurality of features, the second scored feature having a proportional score that is less than the proportional score of the first scored feature and that is no less than the proportional score of each other feature, except for the first scored feature, in the plurality of features; wherein generating the plurality of constrained decision trees comprises: generating the plurality of constrained decision trees having the plurality of respective first splits such that a proportion of the first splits that corresponds to the second scored feature is based at least in part on the proportional score of the second scored feature.

(F3) In the method of any of F1-F2, wherein each ranking list further indicates a second rank that is assigned to a respective feature of the plurality of features, the second rank indicating that the respective feature ranks higher in the ranking list than each other feature of the plurality of features, except for the respective feature to which the first rank is assigned; wherein the method further comprises: determining a second proportional score for each feature of the plurality of features, each second proportional score indicating a proportion of the plurality of ranking lists indicating that the second rank is assigned to the respective feature; and identifying a second scored feature of the plurality of features, the second scored feature having a second proportional score that is no less than the second proportional score of each other feature in the plurality of features; and wherein generating the plurality of constrained decision trees comprises: generating the plurality of constrained decision trees having a plurality of respective second splits such that a proportion of the second splits that corresponds to the second scored feature is based at least in part on the second proportional score of the second scored feature.

(F4) In the method of any of F1-F3, wherein each ranking list further indicates a third rank that is assigned to a respective feature of the plurality of features, the third rank indicating that the respective feature ranks higher in the ranking list than each other feature of the plurality of features, except for the respective feature to which the first rank is assigned and the respective feature to which the second rank is assigned; wherein the method further comprises: determining a third proportional score for each feature of the plurality of features, each third proportional score indicating a proportion of the plurality of ranking lists indicating that the third rank is assigned to the respective feature; and identifying a third scored feature of the plurality of features, the third scored feature having a third proportional score that is no less than the third proportional score of each other feature in the plurality of features;

and wherein generating the plurality of constrained decision trees comprises: generating the plurality of constrained decision trees having a plurality of respective third splits such that a proportion of the third splits that corresponds to the third scored feature is based at least in part on the third proportional score of the third scored feature.

(F5) In the method of any of F1-F4, further comprising: for each selected observation, aggregating a plurality of fuzzy labels indicating a plurality of respective non-binary scores assigned to the respective selected observation to provide a respective aggregated fuzzy label indicating a likelihood of a designated result of the respective selected observation, wherein each plurality of fuzzy labels is associated with the plurality of respective humans; wherein generating the plurality of constrained decision trees comprises: generating the plurality of constrained decision trees further such that the plurality of constrained decision trees generates a plurality of respective predictions that are based at least in part on respective subsets of the aggregated fuzzy labels; and wherein generating the machine learning model comprises: configuring the machine learning model to have an output that corresponds to an aggregation of the plurality of predictions that are generated by the plurality of respective constrained decision trees.

(F6) In the method of any of F1-F5, further comprising: identifying each of the identified observations that has a similarity to a specified selected observation that is greater than or equal to a similarity threshold; and assigning the aggregated fuzzy label of the specified selected observation to each of the identified observations that has a similarity to the specified selected observation that is greater than or equal to the similarity threshold.

(F7) In the method of any of F1-F6, further comprising: for each of the selected observations, identifying each of the identified observations that has a similarity to the respective selected observation that is greater than or equal to a similarity threshold; and for each of the selected observations, assigning the aggregated fuzzy label of the respective selected observation to each of the identified observations that has a similarity to the respective selected observation that is greater than or equal to the similarity threshold.

(F8) In the method of any of F1-F7, wherein generating the judgmental sample further comprises: determining that the proportion of a designated combination of features among the selected observations, which is the same as the proportion of the designated combination of features among the identified observations, is less than or equal to a proportion threshold; determining that an importance of the designated combination of features is greater than or equal to an importance threshold; and based at least in part on the importance of the designated combination of features being greater than or equal to the importance threshold, increasing the proportion of the designated combination of features among the selected observations to be greater than the proportion of the designated combination of features among the identified observations and to be greater than the proportion threshold.

(F9) In the method of any of F1-F8, wherein generating the judgmental sample further comprises: determining that a proportion of a selected observation among the selected observations is less than or equal to a proportion threshold; and removing the selected observation from the judgmental sample based at least in part on the proportion of the selected observation among the selected observations being less than or equal to the proportion threshold.

(G1) A first example computer program product (FIG. 9, 918, 922) comprising a computer-readable storage medium having instructions recorded thereon for enabling a processor-based system (FIG. 1, 102A-102M, 106A-106N; FIG. 3, 300; FIG. 9, 900) to perform operations. The operations comprise generating (FIG. 2, 202) a judgmental sample by selecting some but not all identified observations (FIG. 3, 332) in a dataset (FIG. 3, 330) using a multivariate stratified sampling technique. Each identified observation includes a subset of features. The multivariate stratified sampling technique results in a proportion of each of multiple subsets of the features among the selected observations (FIG. 3, 340) being the same as a proportion of the respective subset of the features among the identified observations. The operations further comprise, for each selected observation, aggregating a plurality of fuzzy labels indicating a plurality of respective non-binary scores assigned to the respective selected observation by respective individuals to provide a respective aggregated fuzzy label indicating a likelihood of a designated result of the respective selected observation. The operations further comprise determining (FIG. 2, 204) important subsets of the features based at least on each important subset being designated as more important than the other features by a respective individual. The operations further comprise determining (FIG. 2, 206) scores for the respective features, each score indicating a proportion of the important subsets of the features that includes the respective feature. The operations further comprise identifying (FIG. 2, 208) a highest scored feature based at least on the highest scored feature having a score that is no less than the score of each of the other features. The operations further comprise generating (FIG. 2, 210) a constrained decision trees (FIG. 3, 348) having respective first splits such that a proportion of the first splits that corresponds to the highest scored feature is selected to be equal to the score of the highest scored feature and further such that the constrained decision trees generate respective predictions based at least on respective subsets of the aggregated fuzzy labels. The constrained decision trees are based at least on respective subsets of the selected observations. The operations further comprise generating (FIG. 2, 212) a machine learning model (FIG. 3, 350) based at least on the constrained decision trees by configuring the machine learning model to have an output that corresponds to an aggregation of the predictions that are generated by the respective constrained decision trees.

(G2) In the computer program product of G1, wherein the operations further comprise: for each of the selected observations, identifying each of the identified observations that has a similarity to the respective selected observation that is greater than or equal to a similarity threshold; and for each of the selected observations, assigning the aggregated fuzzy label of the respective selected observation to each of the identified observations that has a similarity to the respective selected observation that is greater than or equal to the similarity threshold.

(G3) In the computer program product of any of G1-G2, wherein the operations further comprise: determining that the proportion of a designated subset of the features among the selected observations, which is the same as the proportion of the designated subset of the features among the identified observations, is less than or equal to a proportion threshold; determining that an importance of the designated subset of the features is greater than or equal to an importance threshold; and based at least on the importance of the designated subset of the features being greater than or equal to the importance threshold, increasing the proportion of the designated subset of the features among the selected observations to be greater than the proportion of the designated subset of the features among the identified observations and to be greater than the proportion threshold.

(G4) In the computer program product of any of G1-G3, wherein the operations further comprise: determining that a proportion of a selected observation among the selected observations is less than or equal to a proportion threshold; and removing the selected observation from the judgmental sample based at least on the proportion of the selected observation among the selected observations being less than or equal to the proportion threshold.

(G5) In the computer program product of any of G1-G4, wherein the operations further comprise: identifying a second-highest scored feature based at least on the second-highest scored feature having a score that is less than the score of the highest scored feature and no less than the score of each of the other features, except for the highest scored feature; and wherein a proportion of the first splits that corresponds to the second-highest scored feature is selected to be equal to the score of the second-highest scored feature.

(H1) A second example computer program product (FIG. 9, 918, 922) comprising a computer-readable storage medium having instructions recorded thereon for enabling a processor-based system (FIG. 1, 102A-102M, 106A-106N; FIG. 3, 300; FIG. 9, 900) to perform operations. The operations comprise generating (FIG. 2, 202) a judgmental sample that includes selected observations (FIG. 3, 340). Each selected observation includes a respective combination of features from a plurality of features. Said generating the judgmental sample comprises selecting the selected observations from identified observations (FIG. 3, 332) in a dataset (FIG. 3, 330) using a multivariate stratified sampling technique that causes a proportion of each combination of features among the selected observations to be same as a proportion of the respective combination of features among the identified observations. The selected observations include fewer than all of the identified observations. The operations further comprise, for each selected observation, aggregating a plurality of fuzzy labels indicating a plurality of respective non-binary scores assigned to the respective selected observation by a plurality of respective humans to provide a respective aggregated fuzzy label indicating a likelihood of a designated result of the respective selected observation. The operations further comprise, determining (FIG. 2, 204) a respective subset of the plurality of features that is designated as being more important than the other features of the plurality of features by each human of the plurality of humans. The operations further comprise, determining (FIG. 2, 206) a proportional score for each feature of the plurality of features. Each proportional score indicates a proportion of the plurality of humans that included the respective feature in the subset of the plurality of features that is designated by the respective human. The operations further comprise, identifying (FIG. 2, 208) a highest scored feature of the plurality of features. The highest scored feature has a proportional score that is no less than the proportional score of each other feature in the plurality of features. The operations further comprise, generating (FIG. 2, 210) a plurality of constrained decision trees (FIG. 3, 348) having a plurality of respective first splits such that a proportion of the first splits that corresponds to the highest scored feature is selected to be equal to the proportional score of the highest scored feature and further such that the plurality of constrained decision trees generates a plurality of respective predictions based at least in part on respective subsets of the aggregated fuzzy labels. The plurality of constrained decision trees are based at least in part on respective subsets of the selected observations. The operations further comprise, generating (FIG. 2, 212) a machine learning model (FIG. 3, 350) based at least in part on the plurality of constrained decision trees by configuring the machine learning model to have an output that corresponds to an aggregation of the plurality of predictions that are generated by the plurality of respective constrained decision trees.

(H2) In the computer program product of H1, wherein the operations further comprise: identifying each of the identified observations that has a similarity to a specified selected observation that is greater than or equal to a similarity threshold; and assigning the aggregated fuzzy label of the specified selected observation to each of the identified observations that has a similarity to the specified selected observation that is greater than or equal to the similarity threshold.

(H3) In the computer program product of any of H1-H2, wherein the operations further comprise: for each of the selected observations, identifying each of the identified observations that has a similarity to the respective selected observation that is greater than or equal to a similarity threshold; and for each of the selected observations, assigning the aggregated fuzzy label of the respective selected observation to each of the identified observations that has a similarity to the respective selected observation that is greater than or equal to the similarity threshold.

(H4) In the computer program product of any of H1-H3, wherein the operations further comprise: determining that the proportion of a designated combination of features among the selected observations, which is the same as the proportion of the designated combination of features among the identified observations, is less than or equal to a proportion threshold; determining that an importance of the designated combination of features is greater than or equal to an importance threshold; and based at least in part on the importance of the designated combination of features being greater than or equal to the importance threshold, increasing the proportion of the designated combination of features among the selected observations to be greater than the proportion of the designated combination of features among the identified observations and to be greater than the proportion threshold.

(H5) In the computer program product of any of H1-H4, wherein the operations further comprise: determining that a proportion of a selected observation among the selected observations is less than or equal to a proportion threshold; and removing the selected observation from the judgmental sample based at least in part on the proportion of the selected observation among the selected observations being less than or equal to the proportion threshold.

(H6) In the computer program product of any of H1-H5, wherein the operations further comprise: identifying a second-highest scored feature of the plurality of features, the second-highest scored feature having a proportional score that is less than the proportional score of the highest scored feature and no less than the proportional score of each other feature, except for the highest scored feature, in the plurality of features; and wherein a proportion of the first splits that corresponds to the second-highest scored feature is selected to be equal to the proportional score of the second-highest scored feature.

III. Example Computer System

FIG. 7 depicts an example computer 700 in which embodiments may be implemented. Any one or more of the user devices 102A-102M and/or any one or more of the servers 106A-106N shown in FIG. 1 and/or computing system 300 shown in FIG. 3 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of (e.g., at least a portion of) the constrained tree-based ML model logic 108, the constrained tree-based ML model logic 308, the sample generation logic 312, the ranking determination logic 314, the scoring logic 316, the feature identification logic 318, the tree generation logic 320, the model generation logic 322, the label aggregation logic 324, the similarity determination logic 326, the multivariate stratified sampling logic 328, the proportion comparison logic 502, the importance determination logic 504, the proportion updating logic 506, flowchart 200 (including any step of flowchart 200), flowchart 400 (including any step of flowchart 400), and/or flowchart 600 (including any step of flowchart 600), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:

memory; and a processing system coupled to the memory, the processing system configured to:

generate a judgmental sample by selecting, using a multivariate stratified sampling technique, specified observations that include fewer than all identified observations in a dataset, each identified observation including a subset of features, wherein use of the multivariate stratified sampling technique results in a proportion of each of multiple subsets of the features among the specified observations being the same as a proportion of the respective subset of the features among the identified observations;

for each specified observation, aggregate a plurality of labels indicating a plurality of respective scores, which are assigned to the respective specified observation and which are associated with respective identifiers corresponding to respective individuals, wherein aggregation of the plurality of labels results in a respective aggregated label indicating a likelihood of a designated result of the respective specified observation;

determine ranking lists that are associated with the respective identifiers corresponding to the respective individuals, each ranking list indicating relative ranks of the respective features;

determine scores for the respective features, each score indicating a proportion of the ranking lists in which the respective feature is ranked highest;

identify a first scored feature based at least on the first scored feature having a score that is no less than the score of each of the other features;

generate constrained decision trees having respective first splits such that a proportion of the first splits that corresponds to the first scored feature is based at least on the score of the first scored feature and further such that respective predictions associated with the constrained decision trees are based at least on respective subsets of the aggregated labels, the constrained decision trees are based at least on respective subsets of the specified observations; and generate a machine learning model based at least on the constrained decision trees by configuring the machine learning model to have an output that corresponds to an aggregation of the predictions associated with the respective constrained decision trees.

2. The system of claim 1, wherein the processing system is configured to:

identify a second scored feature based at least on the second scored feature having a score that is less than the score of the first scored feature and that is no less than the score of each of the other features, except for the first scored feature; and generate the constrained decision trees having the respective first splits such that a proportion of the first splits that corresponds to the second scored feature is based at least on the score of the second scored feature.

3. The system of claim 1, wherein the processing system is configured to:

determine a second score for each of the features, each second score indicating a proportion of the ranking lists in which the respective feature is ranked second-highest;

identify a second scored feature based at least on the second scored feature having a second score that is no less than the second score of each of the other features; and generate the constrained decision trees having respective second splits such that a proportion of the second splits that corresponds to the second scored feature is based at least on the second score of the second scored feature.

4. The system of claim 3, wherein the processing system is configured to:

determine a third score for each of the features, each third score indicating a proportion of the ranking lists in which the respective feature is ranked third-highest;

identify a third scored feature based at least on the third scored feature having a third score that is no less than the third score of each of the other features; and generate the constrained decision trees having respective third splits such that a proportion of the third splits that corresponds to the third scored feature is based at least on the third score of the third scored feature.

5. The system of claim 1, wherein the processing system is configured to:

for each specified observation, aggregate a plurality of fuzzy labels indicating a plurality of respective non-binary scores assigned to the respective specified observation, wherein aggregation of the plurality of fuzzy labels results in a respective aggregated fuzzy label indicating the likelihood of the designated result of the respective specified observation, wherein each plurality of fuzzy labels is associated with the respective identifiers corresponding to the respective individuals; and generate the constrained decision trees such that the respective predictions associated with the constrained decision trees are based at least on respective subsets of the aggregated fuzzy labels.

6. The system of claim 5, wherein the processing system is further configured to:

identify each of the identified observations that has a similarity to a particular specified observation that is greater than or equal to a similarity threshold; and assign the aggregated fuzzy label of the particular specified observation to each of the identified observations that has a similarity to the particular specified observation that is greater than or equal to the similarity threshold.

7. The system of claim 1, wherein the processing system is configured to:

determine that the proportion of a designated subset of the features among the specified observations, which is the same as the proportion of the designated subset of features among the identified observations, is less than or equal to a proportion threshold;

determine that an importance of the designated subset of the features is greater than or equal to an importance threshold; and based at least on the importance of the designated subset of the features being greater than or equal to the importance threshold, increase the proportion of the designated subset of the features among the specified observations to be greater than the proportion of the designated subset of the features among the identified observations and to be greater than the proportion threshold.

8. The system of claim 1, wherein the processing system is configured to:

determine that a proportion of a specified observation among the specified observations is less than or equal to a proportion threshold; and remove the specified observation from the judgmental sample based at least on the proportion of the specified observation among the specified observations being less than or equal to the proportion threshold.

9. A method implemented by a computing system, the method comprising:

generating a judgmental sample by selecting, using a multivariate stratified sampling technique, specified observations that include fewer than all identified observations in a dataset, each identified observation including a subset of features, wherein using the multivariate stratified sampling technique results in a proportion of each of multiple subsets of the features among the specified observations being the same as a proportion of the respective subset of the features among the identified observations;

for each specified observation, aggregating a plurality of labels indicating a plurality of respective scores, which are assigned to the respective specified observation and which are associated with respective identifiers corresponding to respective individuals, the aggregating resulting in a respective aggregated label indicating a likelihood of a designated result of the respective specified observation;

determining important subsets of the features based at least on each important subset being designated as more important than the other features with regard to a respective identifier corresponding to a respective individual;

determining scores for the respective features, each score indicating a proportion of the important subsets of the features that includes the respective feature;

identifying a highest scored feature based at least on the highest scored feature having a score that is no less than the score of each of the other features;

generating constrained decision trees having respective first splits such that a proportion of the first splits that corresponds to the highest scored feature is based at least on the score of the highest scored feature and further such that respective predictions associated with the constrained decision trees are based at least on respective subsets of the aggregated labels, the constrained decision trees are based at least on respective subsets of the specified observations; and generating a machine learning model based at least on the constrained decision trees by configuring the machine learning model to have an output that corresponds to an aggregation of the predictions associated with the respective constrained decision trees.

10. The method of claim 9, wherein aggregating the plurality of labels comprises:

for each specified observation, aggregating a plurality of fuzzy labels indicating a plurality of respective non-binary scores, which are assigned to the respective specified observation and which are associated with the respective identifiers corresponding to the respective individuals, the aggregating resulting in a respective aggregated fuzzy label indicating the likelihood of the designated result of the respective specified observation; and wherein generating the constrained decision trees comprises:

generating the constrained decision trees such that the respective predictions associated with the constrained decision trees are based at least on respective subsets of the aggregated fuzzy labels.

11. The method of claim 10, further comprising:

for each of the specified observations, identifying each of the identified observations that has a similarity to the respective specified observation that is greater than or equal to a similarity threshold; and for each of the specified observations, assigning the aggregated fuzzy label of the respective specified observation to each of the identified observations that has a similarity to the respective specified observation that is greater than or equal to the similarity threshold.

12. The method of claim 9, wherein generating the judgmental sample further comprises:

determining that the proportion of a designated subset of the features among the specified observations, which is the same as the proportion of the designated subset of the features among the identified observations, is less than or equal to a proportion threshold;

determining that an importance of the designated subset of the features is greater than or equal to an importance threshold; and based at least on the importance of the designated subset of the features being greater than or equal to the importance threshold, increasing the proportion of the designated subset of the features among the specified observations to be greater than the proportion of the designated subset of the features among the identified observations and to be greater than the proportion threshold.

13. The method of claim 9, wherein generating the judgmental sample further comprises:

determining that a proportion of a specified observation among the specified observations is less than or equal to a proportion threshold; and removing the specified observation from the judgmental sample based at least on the proportion of the specified observation among the specified observations being less than or equal to the proportion threshold.

14. The method of claim 9, further comprising:

identifying a second-highest scored feature based at least on the second-highest scored feature having a score that is less than the score of the highest scored feature and no less than the score of each of the other features, except for the highest scored feature;

wherein a proportion of the first splits that corresponds to the second-highest scored feature is based at least on the score of the second-highest scored feature.

15. The method of claim 9, wherein each important subset of the features includes a respective single feature that is designated as being more important than the other features with regard to the respective identifier corresponding to the respective individual.

16. A computer program product comprising a computer-readable storage medium having instructions recorded thereon for enabling a processor-based system to perform operations, the operations comprising:

generating a judgmental sample by selecting, using a multivariate stratified sampling technique, specified observations that include fewer than all identified observations in a dataset, each identified observation including a subset of features, wherein using the multivariate stratified sampling technique results in a proportion of each of multiple subsets of the features among the specified observations being the same as a proportion of the respective subset of the features among the identified observations;

for each specified observation, aggregating a plurality of fuzzy labels indicating a plurality of respective non-binary scores, which are assigned to the respective specified observation and which are associated with respective identifiers corresponding to respective individuals, the aggregating resulting in a respective aggregated fuzzy label indicating a likelihood of a designated result of the respective specified observation;

determining important subsets of the features based at least on each important subset being designated as more important than the other features with regard to a respective identifier corresponding to a respective individual;

determining scores for the respective features, each score indicating a proportion of the important subsets of the features that includes the respective feature;

identifying a highest scored feature based at least on the highest scored feature having a score that is no less than the score of each of the other features;

generating constrained decision trees having respective first splits such that a proportion of the first splits that corresponds to the highest scored feature is selected to be equal to the score of the highest scored feature and further such that respective predictions associated with the constrained decision trees are based at least on respective subsets of the aggregated fuzzy labels, the constrained decision trees are based at least on respective subsets of the specified observations; and generating a machine learning model based at least on the constrained decision trees by configuring the machine learning model to have an output that corresponds to an aggregation of the predictions by associated with the respective constrained decision trees.

17. The computer program product of claim 16, wherein the operations further comprise:

for each of the specified observations, identifying each of the identified observations that has a similarity to the respective specified observation that is greater than or equal to a similarity threshold; and for each of the specified observations, assigning the aggregated fuzzy label of the respective specified observation to each of the identified observations that has a similarity to the respective specified observation that is greater than or equal to the similarity threshold.

18. The computer program product of claim 16, wherein the operations further comprise:

determining that the proportion of a designated subset of the features among the specified observations, which is the same as the proportion of the designated subset of the features among the identified observations, is less than or equal to a proportion threshold;

determining that an importance of the designated subset of the features is greater than or equal to an importance threshold; and based at least on the importance of the designated subset of the features being greater than or equal to the importance threshold, increasing the proportion of the designated subset of the features among the specified observations to be greater than the proportion of the designated subset of the features among the identified observations and to be greater than the proportion threshold.

19. The computer program product of claim 16, wherein the operations further comprise:

determining that a proportion of a specified observation among the specified observations is less than or equal to a proportion threshold; and removing the specified observation from the judgmental sample based at least on the proportion of the specified observation among the specified observations being less than or equal to the proportion threshold.

20. The computer program product of claim 16, wherein the operations further comprise:

identifying a second-highest scored feature based at least on the second-highest scored feature having a score that is less than the score of the highest scored feature and no less than the score of each of the other features, except for the highest scored feature; and wherein a proportion of the first splits that corresponds to the second-highest scored feature is selected to be equal to the score of the second-highest scored feature.

* * * * *